US012682149B2

(12) United States Patent
Wright

(10) Patent No.: US 12,682,149 B2
(45) Date of Patent: Jul. 14, 2026

(54) SYSTEMS AND METHODS FOR COMPUTER GENERATION OF A MODIFIABLE PRODUCT DESCRIPTION

(71) Applicant: Shopify Inc., Ottawa (CA)

(72) Inventor: Asher Wright, Victoria (CA)

(73) Assignee: SHOPIFY INC., Ottawa (CA)

( * ) Notice: Subject to any disclaimer, the term of this patent is extended or adjusted under 35 U.S.C. 154(b) by 468 days.

(21) Appl. No.: 17/670,110

(22) Filed: Feb. 11, 2022

(65) Prior Publication Data

US 2023/0259692 A1 Aug. 17, 2023

(51) Int. Cl.
*G06F 40/166* (2020.01)
*G06F 40/289* (2020.01)
*G06F 40/40* (2020.01)

(52) U.S. Cl.
CPC .......... *G06F 40/166* (2020.01); *G06F 40/289* (2020.01); *G06F 40/40* (2020.01)

(58) Field of Classification Search
CPC ...... G06F 40/166; G06F 40/289; G06F 40/40; G06F 40/56
See application file for complete search history.

(56) References Cited

U.S. PATENT DOCUMENTS 9,589,228 B1 * 3/2017 Gorski .................. G06N 5/025
9,760,560 B2 * 9/2017 Corston ................ G06F 40/253
2010/0179803 A1 * 7/2010 Sawaf ..................... G06F 40/40 704/E15.003
2016/0140435 A1 * 5/2016 Bengio .................. G06N 3/045 382/158
2016/0275070 A1 * 9/2016 Corston ................ G06F 40/253
2018/0052885 A1 * 2/2018 Gaskill ..................... G06N 5/04
2019/0272325 A1 * 9/2019 Korn ....................... G10L 13/08
2021/0365514 A1 * 11/2021 Huet ................... G06F 16/9535
2022/0245341 A1 * 8/2022 Kedia ..................... G06F 40/30
(Continued)

OTHER PUBLICATIONS

An article describing the process of generating a product description using a generative language model. M.-T. Nguyen, P.-T. Nguyen, V.-V. Nguyen and Q.-M. Nguyen, "Generating Product Description with Generative Pre-trained Transformer 2," 2021 6th International Conference on Innovative Technology (Year: 2021).*
(Continued)

*Primary Examiner* — Andrew C Flanders
*Assistant Examiner* — Cameron Kenneth Young

(57) ABSTRACT

Generative language models are able to generate a sequence of text that may closely mimic a native human speaker's own generated text. However, technical challenges exist when implementing a generative language model for generating product descriptions. The model may output certain inaccuracies due to the predictive nature of generating the output. Further, the model does not have the ability to identify words from the product description that a merchant may want to modify, nor the ability to provide meaningful alternatives to such words. In some embodiments, a natural language processor might be built and/or trained using classification data. The natural language processor may identify one or more words and/or phrases in a product description as a candidate for modification. The product description might then be displayed on a merchant-facing user interface with an indication that the candidate for modification may be modified.

20 Claims, 14 Drawing Sheets

(56) References Cited

U.S. PATENT DOCUMENTS

| | | | | |
|---|---|---|---|---|
| 2022/0405488 | A1* | 12/2022 | Yuan | G06F 40/211 |
| 2023/0027530 | A1* | 1/2023 | Jeganathan | G06F 16/951 |

OTHER PUBLICATIONS

Alammar, Jay, "The Illustrated Transformer". Published on Jun. 27, 2018. Accessed on Feb. 10, 2022. Retrieved from: https://jalammar.github.io/illustrated-transformer/.

Giacaglia, Giuliano, "How Transformers Work". Published on Mar. 10, 2019. Accessed on Feb. 10, 2022. Retrieved from: https://towardsdatascience.com/transformers-141e32e69591.

Vaswani, Ashish et al., "Attention Is All You Need". Published on Dec. 6, 2017. 31st Conference on Neural Information Processing Systems (NIPS 2017), Long Beach, CA, USA. 15 pages.

* cited by examiner

1200

| Section Order | Category |
|---|---|
| [1] | Sale/Catalog Information |
| [2] | Location/Setting Context |
| [3] | Material |

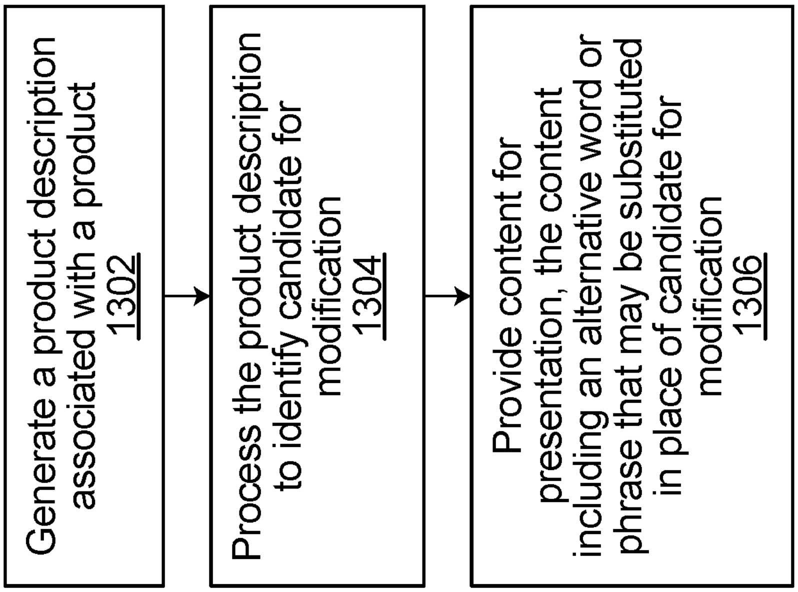

FIG. 13

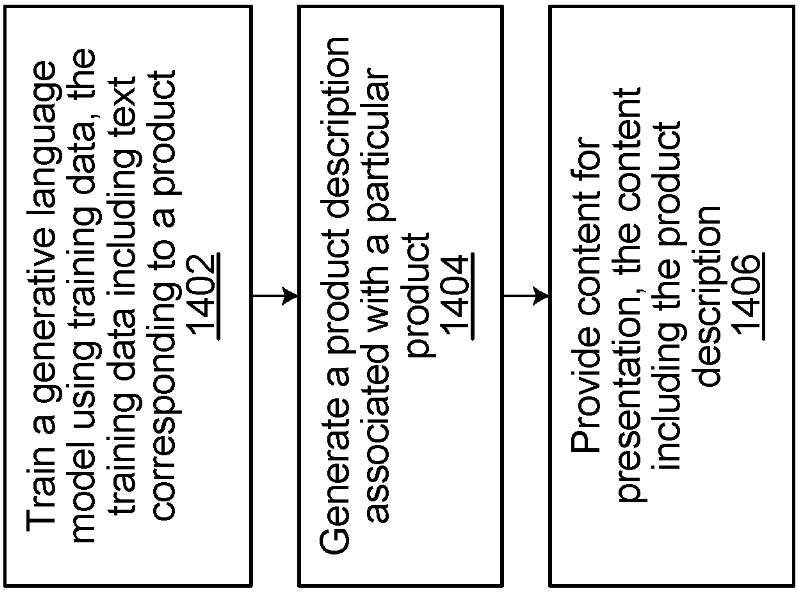

FIG. 14

Train a generative language model using training data, the training data including text corresponding to a product 1402

Generate a product description associated with a particular product 1404

Provide content for presentation, the content including the product description 1406

Generate a product description associated with a product 1302

Process the product description to identify candidate for modification 1304

Provide content for presentation, the content including an alternative word or phrase that may be substituted in place of candidate for modification 1306

Receive an indication of an order in which a plurality of sections of a product description are to be arranged relative to each other
1502

Generate or modify product description text to obtain the product description arranged in the order
1504

Provide content for presentation, the content including the product description
1506

SYSTEMS AND METHODS FOR COMPUTER GENERATION OF A MODIFIABLE PRODUCT DESCRIPTION

FIELD

The present application relates to computer-generation of text.

BACKGROUND

Natural language processing (NLP) models are used in a variety of computer applications and have been the driving force behind the development in certain areas of technology such as interactive assistants, machine translations, and sentiment analysis. In the field of text generation, NLP models might be used to output, in response to an input, a sequence of text.

SUMMARY

In the context of e-commerce, a merchant may wish to add descriptions relating to products that they offer for sale online. However, creating individual product descriptions can be time consuming, especially for merchants with a large product catalog or who sell products in multiple categories. NLP models, such as generative language models, can help by generating a description based on a prompt, such as a product title. While generative language models in the past often lacked the sophistication to generate sequences of text free from spelling or grammar mistakes or oddities, current state-of-the-art generative language models are able to generate a sequence of text that may closely mimic a native human speaker's own generated text.

The following technical challenges exist when implementing a generative language model for generating product descriptions.

The accuracy of the description produced by a generative language model is dependent on the variety of data used to train the model. Having been trained on a large and diverse text corpus, in some cases the description that the model outputs may have certain inaccuracies due to the predictive nature of generating the output. For example, having received a prompt of "floral summer dress", the computer may execute the model to return a product description stating that the dress is "made of 100% Egyptian cotton" when the dress is actually made of a blend of cotton and polyester.

A merchant may wish to modify certain words in a generated product description for a number of reasons, such as the existence of an error or inaccuracy similar to the one noted above, or because there may be alternative words which the merchant prefers over certain words generated by the generative language model. However, the model does not identify words from the product description that a merchant may want to modify. Moreover, the model does not provide meaningful alternatives to such words.

In some embodiments, a natural language processor might be built and/or trained using classification data. The natural language processor may be implemented by a machine learning algorithm. Post-training, a product description created by a generative language model might be fed into the natural language processor. The output of the generative language model may be sequential, and each next segment of the product description may be the segment with the highest probability of being the next segment in the sequence. The natural language processor may identify one or more words and/or phrases in the product description as a candidate for modification. The product description might then be displayed on a merchant-facing UI. The UI might indicate, via an interactive user interface element such as a dropdown menu, for example, that a word or phrase identified as a candidate for modification can be substituted with an alternative word or phrase. This alternative word or phrase might be one ranked by the generative language model as having the second highest probability of being the word or phrase at that portion of the production description, or might be suggested by an image analysis model trained to infer distinct visual features of a product, or pulled from data stored in an e-commerce platform, or entered by a merchant.

In some embodiments, there is provided a computer-implemented method. The method may include a step of generating a product description associated with a product using a generative language model. The method may further include processing the product description to identify at least a word or phrase in the product description as a candidate for modification, and providing content for presentation. The content may include the product description and an alternative word or phrase that may be substituted in place of the candidate for modification.

In some embodiments, generating the product description may include a step of receiving a prompt, the prompt including text corresponding to the product. In some embodiments, generating the product description may further include a step of inputting the prompt into the generative language model. In some embodiments, the prompt may further include one or both of an example product title and an example product description. In some embodiments, the generative language model may sequentially output segments of the production description, and each next segment may be determined by the generative language model as being associated with a highest probability of being the next segment. In some embodiments, the alternative word or phrase that may be substituted in place of the candidate for modification may be a particular word or phrase that was determined by the generative language model as being associated with a lower probability of being the next segment and not used to form part of the product description. In some embodiments, the alternative word or phrase that may be substituted in place of the candidate for modification may be determined based on use of the alternative word or phrase in relation to other products.

In some embodiments, the method may further include a step of processing an image depicting the product to obtain an attribute related to the product as depicted in the image. In some embodiments, the method may further include a step of including, in the content, a particular word or phrase associated with the attribute. In some embodiments, the method may further include modifying the product description to include the particular word or phrase associated with the attribute. In some embodiments, the alternative word or phrase that may be substituted in place of the candidate for modification may be the particular word or phrase associated with the attribute.

In some embodiments, there is provided another computer-implemented method. The method may include a step of training a generative language model using training data. The training data may include text corresponding to a product determined to be associated with market success. The text may be determined to be associated with market success of the product. The method may further include generating a product description associated with a particular product using the generative language model, and providing content for presentation. The content may include the product description.

In some embodiments, there is provided another computer-implemented method. The method may include a step of receiving an indication of an order in which a plurality of sections of a product description are to be arranged relative to each other. The method may further include generating or modifying product description text to obtain the product description arranged in the order indicated, and providing content for presentation. The content may include the product description.

A system is also disclosed that is configured to perform the methods disclosed herein. For example, the system may include at least one processor to directly perform (or instruct the system to perform) the method steps.

In another embodiment, there is provided a computer readable medium having stored thereon computer-executable instructions that, when executed by a computer, cause the computer to perform operations of the methods disclosed herein.

BRIEF DESCRIPTION OF THE DRAWINGS

Embodiments will be described, by way of example only, with reference to the accompanying figures wherein:

FIGS. 13 to 15 each illustrate computer-implemented methods, according to various embodiments.

DETAILED DESCRIPTION

For illustrative purposes, specific embodiments will now be explained in greater detail below in conjunction with the figures.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
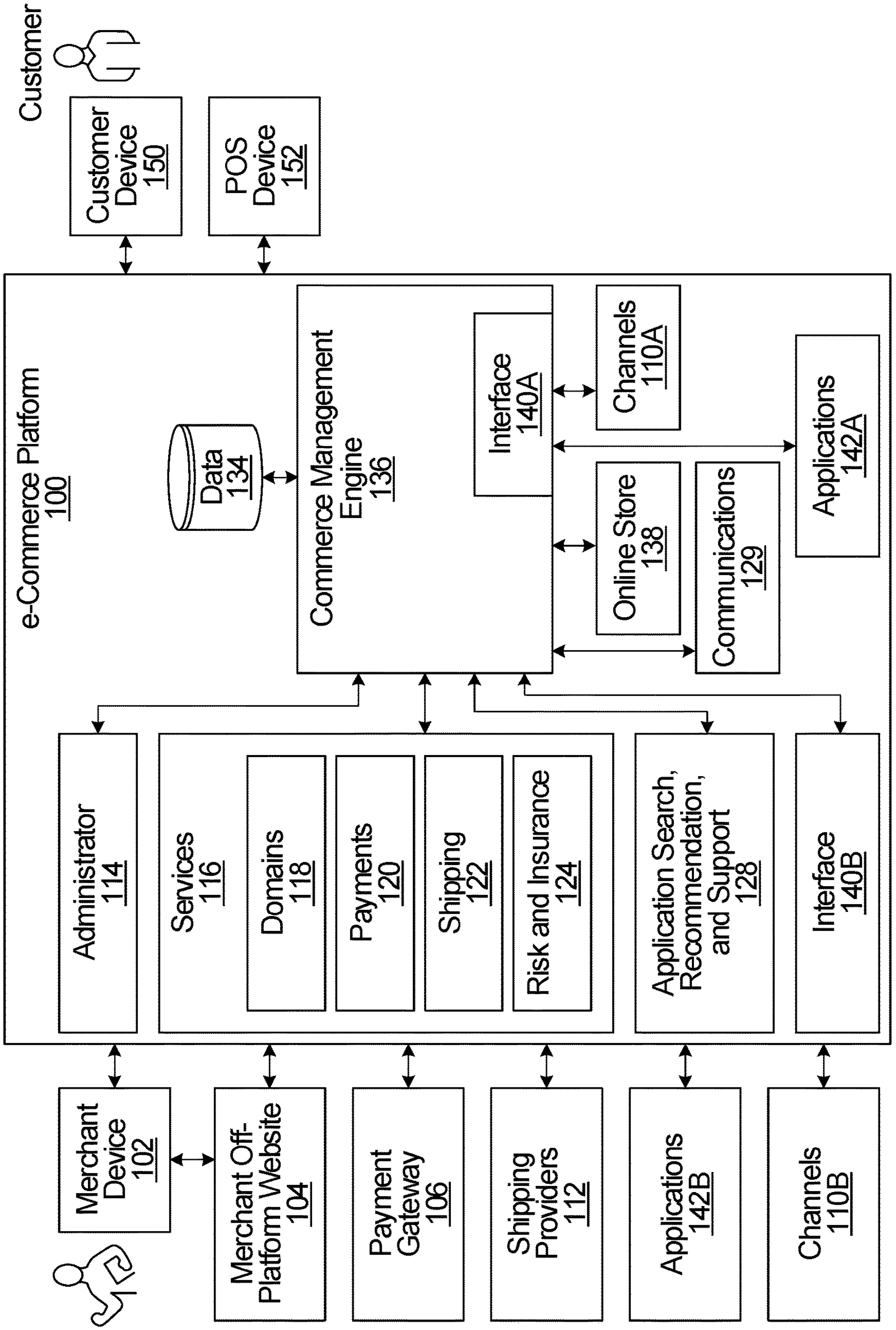
FIG. 1 is a block diagram of an e-commerce platform, according to some embodiments.

FIG. 1 illustrates an example e-commerce platform 100, according to some embodiments. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
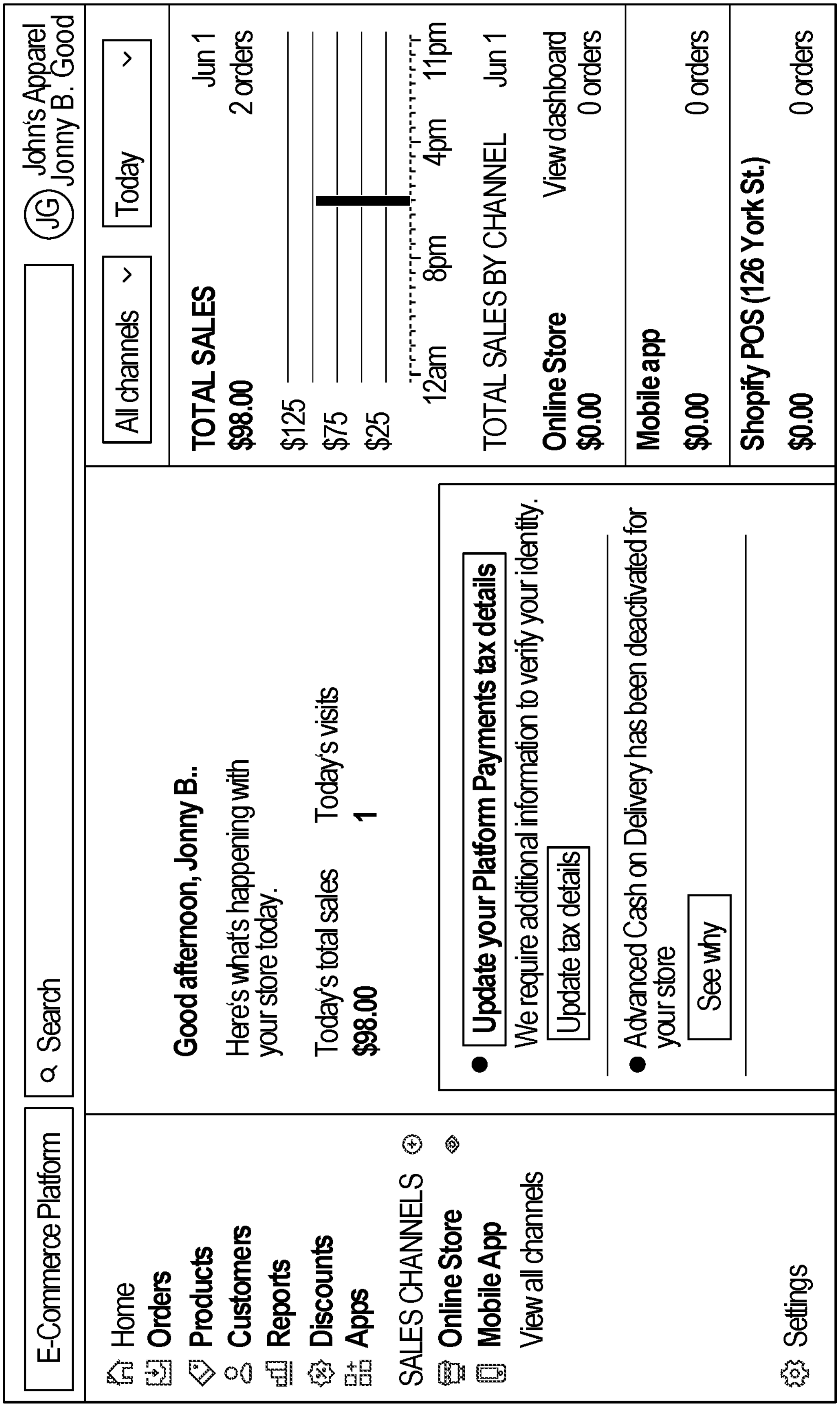
FIG. 2 illustrates a home page of an administrator, according to some embodiments.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In some embodiments, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Generating a Modifiable Product Description in the e-Commerce Platform 100

A product description is a piece of text that explains what a product is and why it may be worth purchasing. A merchant may wish to add a product description for each product the merchant sells on e-commerce platform 100 to inform customers about the products. However, creating individual product descriptions can be time consuming. Therefore, a merchant may decide to use a generative language model to create product descriptions.

Currently, there are various technical challenges to implementing a generative language model to generate product descriptions. For example, a merchant may wish to modify certain words in a generated product description for a number of reasons, such as the existence of an error or inaccuracy, or because there may be alternate words which the merchant prefers over certain words generated by the generative language model. However, current generative language models do not identify words from the product description that the merchant may want to modify. Moreover, these models do not provide meaningful alternatives to such words.

Figure 3:
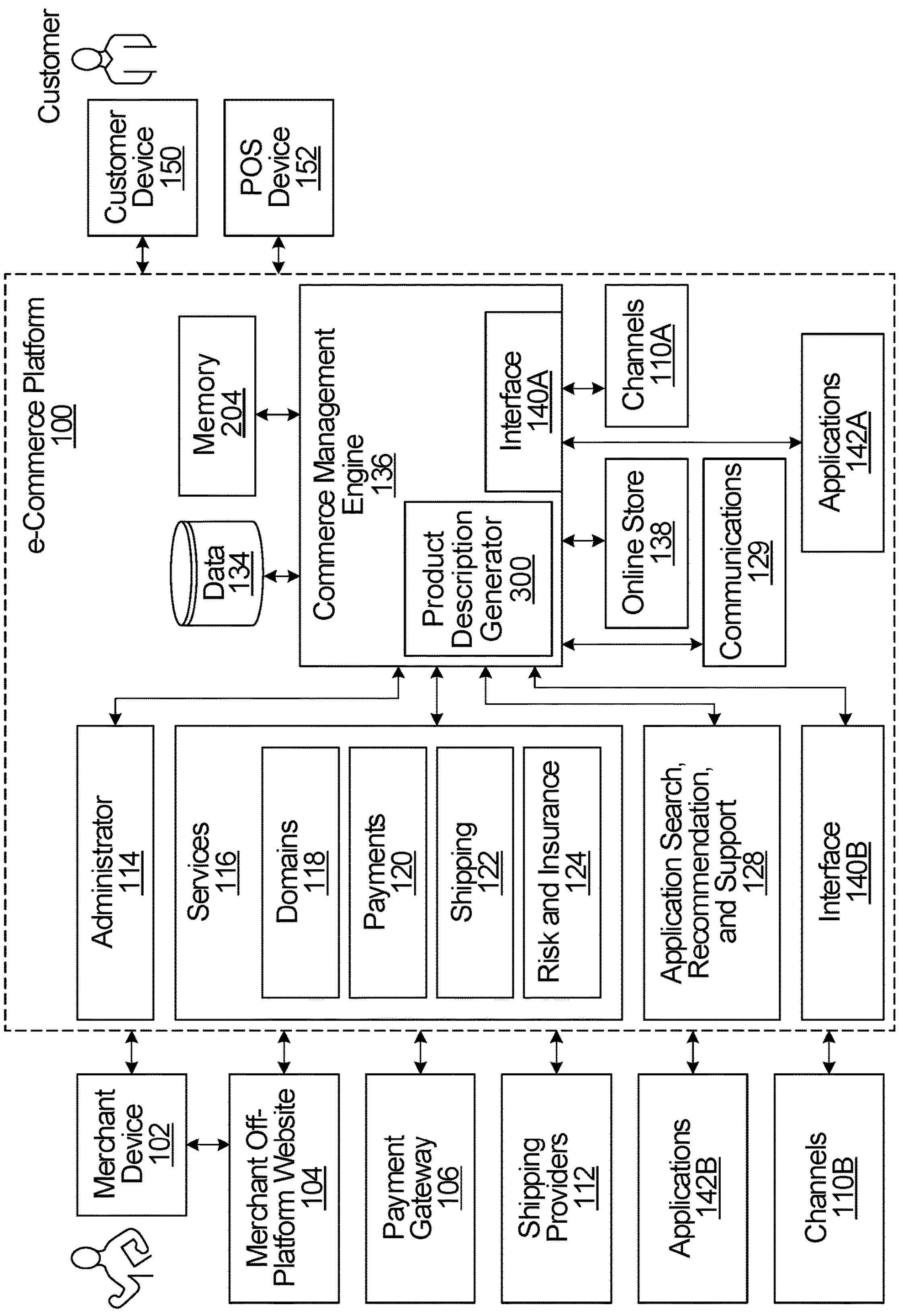
FIG. 3 illustrates the e-commerce platform of FIG. 1, but with a memory and a product description generator.

FIG. 3 illustrates the e-commerce platform 100 of FIG. 1, but with the additions of a product description generator 300 and a memory 204. The product description generator 300 may be embodied as part of the commerce management engine 136. The product description generator 300 performs the modifiable product description generating methods disclosed herein. For example, the product description generator 300 may generate a product description associated with a merchant's product, and may allow for certain portions of the generated product description to be modified, e.g. via a generative language model and a natural language processor in the manner described herein. The product description generator 300 may be implemented by one or more general-purpose processors that execute instructions stored in a memory (e.g. in memory 204) or stored in another computer-readable medium. The instructions, when executed, may cause the product description generator 300 to perform the operations of the product description generator 300, e.g., operations relating to the generation of a modifiable product description for a merchant's online store 138. Alternatively, some or all of the product description generator 300 may be implemented using dedicated circuitry, such as an application specific integrated circuit (ASIC), a graphics processing unit (GPU), or a programmed field programmable gate array (FPGA). In some embodiments, the product description generator 300 may be located inside the e-commerce platform 100 but external to, and coupled to, the commerce management engine 136. In some embodiments, the product description generator 300 may instead be located externally to the e-commerce platform 100 and possibly coupled to the commerce management engine 136.

Although the product description generator 300 in FIG. 3 is illustrated as a distinct component of the e-commerce platform 100 in commerce management engine 136, this is only an example. The product description generator 300 could also or instead be provided by another component residing within or external to the e-commerce platform 100. In some embodiments, either or both of the applications 142A-B may provide a product description generator 300 that implements the functionality described herein. The location of the product description generator 300 is implementation specific. In some implementations, the product description generator 300 is provided at least in part by an e-commerce platform, either as a core function of the e-commerce platform or as an application or service supported by or communicating with the e-commerce platform.

Although the embodiments described herein may be implemented using the product description generator 300 in e-commerce platform 100, the embodiments are not limited to the specific e-commerce platform 100 of FIGS. 1 to 3 and could be used in connection with any e-commerce platform. Also, the embodiments described herein need not necessarily be implemented in association with an e-commerce platform, but might instead be implemented as a standalone component or service. Therefore, the embodiments below will be described more generally.

Example System for Generating a Modifiable Product Description

Figure 4:
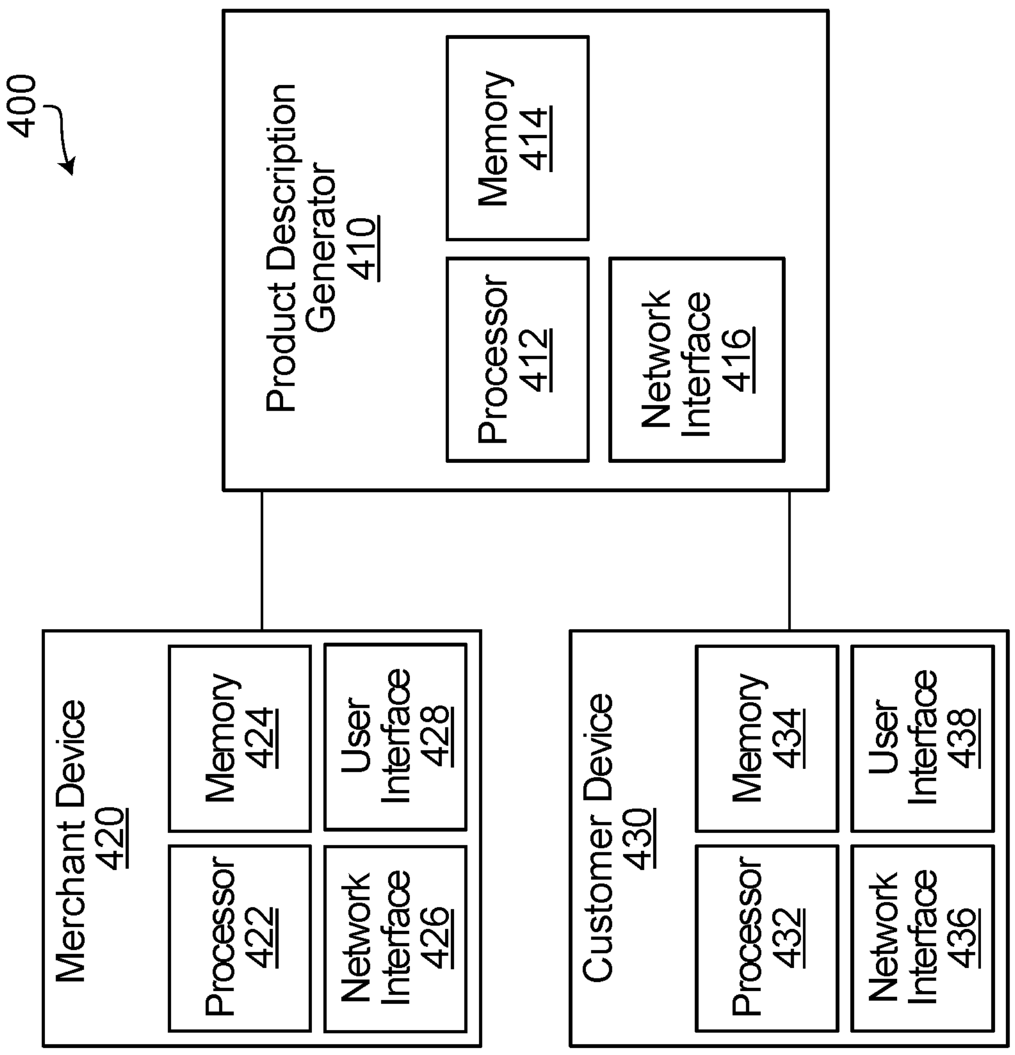
FIG. 4 illustrates a system for generating a modifiable product description, according to some embodiments.

FIG. 4 illustrates a system 400 for generating a modifiable product description associated with a product sold by a merchant, according to some embodiments. The system 400 includes a product description generator 410, at least one merchant device 420, and at least one customer device 430. For ease of reference, only a single merchant device 420 and a single customer device 430 are shown here. The merchant device 420 and/or the customer device 430 may alternatively be referred to as a user device.

The product description generator 410 may be part of an e-commerce platform, e.g. e-commerce platform 100. The product description generator 410 of system 400 includes a processor 412, a memory 414, and a network interface 416.

The processor 412 directly performs, or instructs the product description generator 410 to perform, the operations described herein as being performed by the product description generator 410, such as generating a product description, processing a product description to identify a candidate for modification, or providing content for presentation on a user interface. The processor 412 may be implemented by one or more general purpose processors that execute instructions stored in a memory (e.g. in memory 414) or stored in another computer-readable medium. The instructions, when executed, cause the processor 412 to directly perform, or instruct the product description generator 410 to perform the operations described herein. In other embodiments, the processor 412 may be implemented using dedicated circuitry, such as a programmed FPGA, a GPU, or an ASIC.

The network interface 416 is for communicating over a network, e.g. to communicate with merchant device 420 and/or customer device 430 described below. The network interface 416 may be implemented as a network interface card (MC), and/or a computer port (e.g. a physical outlet to which a plug or cable connects), and/or a network socket, etc., depending upon the implementation.

A single memory 414 is shown in FIG. 4, but in implementation the memory 414 may be distributed. The memory 414 may store instructions and data used or generated by the product description generator 410. For example, the memory 414 may store software instructions or modules configured to implement some or all of the functionality and/or embodiments described herein and that are executed by the processor 412.

In some embodiments, the product description generator 410 may be implemented inside of an e-commerce platform, e.g. inside e-commerce platform 100. In some embodiments, the processor 412, memory 414, and/or network interface 416 may be located outside of the product description generator 410.

A plurality of merchants may communicate with (e.g. access) the product description generator 410 over a network using merchant devices. For example, a merchant may input information relating to a product, e.g. a product title, using the merchant device 420. The merchant device 420 may be a mobile device (e.g. a smartphone, laptop, tablet), a desktop computer, an augmented reality (AR) device, etc., depending upon the implementation. The merchant device 420 includes a processor 422, a memory 424, a user interface 428, and a network interface 426. The processor 422 directly performs, or instructs the merchant device 420 to perform, the operations of the merchant device 420 described herein, e.g. enabling the merchant to enter, via the use of user interface 428, a prompt including a product title, for which the merchant wants a modifiable product description generated. The processor 422 may be implemented by one or more general purpose processors that execute instructions stored in a memory (e.g. memory 424) or stored in another computer-readable medium. The instructions, when executed, cause the processor 422 to directly perform, or instruct the merchant device 420 to perform, the operations described herein. In other embodiments, the processor 422 may be implemented using dedicated circuitry, such as a programmed FPGA, a GPU, or an ASIC.

The user interface (UI) 428 may be implemented as a display screen (which may be a touch screen), and/or a keyboard, and/or a mouse, etc., depending upon the implementation. The network interface 426 is for communicating with the product description generator 410 over the network. The structure of the network interface 426 will depend on how the merchant device 420 interfaces with the network. For example, if the merchant device 420 is a mobile phone, laptop, or tablet, the network interface 426 may comprise a transmitter/receiver with an antenna to send and receive wireless transmissions to/from the network. If the merchant device 420 is a personal computer connected to the network with a network cable, the network interface 426 may comprise a NIC, and/or a computer port (e.g. a physical outlet to which a plug or cable connects), and/or a network socket, etc.

A plurality of customers may access the product description generator 410 over a network using customer devices, e.g. to be provided with a product description. The customer device 430 may be a mobile device (e.g. a smartphone, laptop, tablet), a desktop computer, an AR device, etc., depending upon the implementation. The customer device 430 includes a processor 432, a memory 434, a user interface 438, and a network interface 436. The processor 432 directly performs, or instructs the customer device 430 to perform, the operations of the customer device 430 described herein, e.g. transmitting a search query through the network interface 436, or displaying, through the user interface 438, a product description generated by the product description generator 410. The processor 432 may be implemented by one or more general purpose processors that execute instructions stored in a memory (e.g. memory 434) or stored in another computer-readable medium. The instructions, when executed, cause the processor 432 to directly perform, or instruct the customer device 430 to perform, the operations described herein. In other embodiments, the processor 432 may be implemented using dedicated circuitry, such as a programmed FPGA, a GPU, or an ASIC.

The user interface 438 may be implemented as a display screen (which may be a touch screen), and/or a keyboard, and/or a mouse, etc., depending upon the implementation. The network interface 436 is for communicating with the product description generator 410 over the network. The structure of the network interface 436 will depend on how the customer device 430 interfaces with the network. For example, if the customer device 430 is a mobile phone, laptop, or tablet, the network interface 436 may comprise a transmitter/receiver with an antenna to send and receive wireless transmissions to/from the network. If the customer device 430 is a personal computer connected to the network with a network cable, the network interface 436 may comprise a NIC, and/or a computer port (e.g. a physical outlet to which a plug or cable connects), and/or a network socket, etc.

In some embodiments, the product description generator 410 is part of an e-commerce platform, e.g. e-commerce platform 100. For example, the product description generator 410 may be product description generator 300 illustrated in FIG. 3. However, this is not necessary. The product description generator 410 may, for example, instead be provided by another component of an e-commerce platform or implemented as a stand-alone component or service that is external to an e-commerce platform. In some embodiments, either or both of the applications 142A-B of FIG. 3 provide the product description generator 410 in the form of a downloadable application that is available for installation, e.g. in relation to a customer and/or merchant account. In other embodiments, the product description generator 410 may be implemented on or in association with a computer system that is not an e-commerce platform. In some embodiments, some operations of the product description generator 410 described herein could potentially be implemented in part on/by merchant device 420 and/or user device 430.

Generating a Modifiable Product Description

A merchant selling products in an online store may wish to have a product description for each of the products sold, or to be sold, on the online store. However, as mentioned above it may be very time consuming and difficult for a merchant to create the product description for each product themselves, particularly if the merchant sells many products or sells many different types of products. Therefore, a merchant may wish to be provided with computer-generated product descriptions for their products. For example, a natural language processing model such as a generative language model may be used to generate product descriptions for the merchant.

However, technical challenges are faced when generating product descriptions with current generative language models. In some cases the description that a model outputs may have certain inaccuracies due to the predictive nature of generating the output. Further, current models do not identify words from the product description that a merchant may want to modify, nor do they provide meaningful alternatives to such words.

Figure 5:
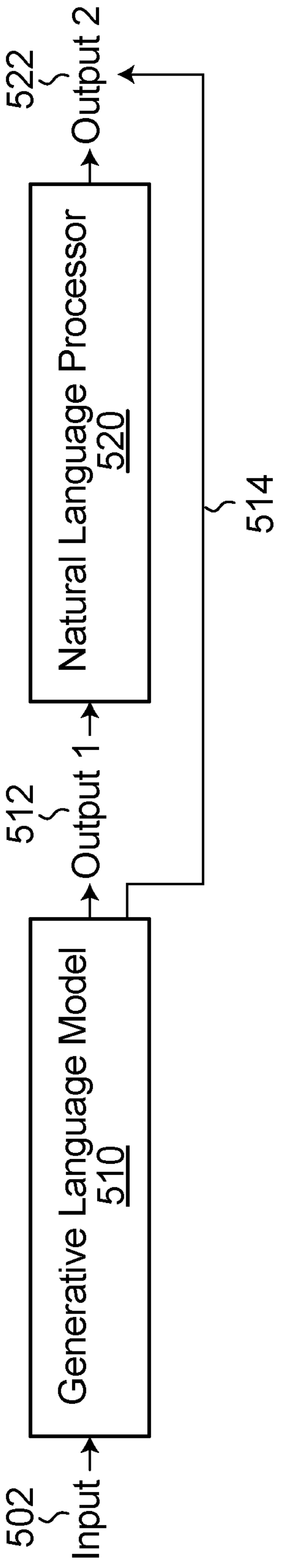
FIG. 5 illustrates an example flowchart for generating a modifiable product description, according to some embodiments.

FIG. 5 illustrates an example flowchart of a modifiable product description being generated by product description generator 410 according to some embodiments. Product description generator 410 may include a generative language model 510 and a natural language processor 520. The methods described as being performed by the generative language model 510 and the natural language processor 520 may be implemented by the processor 412, retrieving data stored from memory 414 as needed. It is noted that although the generative language model 510 and natural language model 520 are described herein as distinct components of the product description generator 410, they may alternatively be integrated as one generative language and processing model (not shown) which performs the methods described as being performed by the generative language model 510 as well as the natural language processor 520. The generative language and processing model may be implemented using a machine learning model.

Input 502 may originate from a merchant on the merchant device 420 via the user interface 428. Input 502 may be or include a prompt. The prompt may include text corresponding to the product for which a modifiable product description is to be generated. For example, input 502 may be or include a product title for which the merchant wants a modifiable product description generated, or it may be or include one or more example product title and product description pairs followed by a product title for which the merchant wants a modifiable product description generated. For example, if the merchant wanted a product description for a ribbed crop tank top product, the merchant may simply enter the words “ribbed crop tank top” as input 502. Alternatively, the merchant may enter one or more example product title and product description pairs, such as “linen halter top” and its corresponding product description, “corduroy cargo pants” and its corresponding product description, “embroidered poplin top” and its corresponding product description, followed by the words “ribbed crop tank top”, as input 502. The one or more example product title and product description pairs may be chosen by the merchant to form part of input 502 because the merchant favours the example product descriptions over other product descriptions. The merchant may favour the example product descriptions over other product descriptions due to the wording, or grammar, or tone, or length, or flow, or any other characteristic possessed by the example product descriptions. By providing the additional example product titles and/or example product descriptions, the generative language model 510 may generate a product description that is different from that generated in the absence of the example product title and/or example product description. The different product description may be generated taking into consideration the example product title and/or example product description and result in a generated product description that possibly has fewer inaccuracies and/or is more consistent with the preferred style of the merchant. This may save processing in subsequent block 520, e.g. by identifying fewer instances of places in which text may need to be modified and/or by presenting fewer alternative words or phrases.

Once the merchant provides the input 502 via the user interface 428, the input may be delivered to the generative language model 510, e.g. by transmitting the input from the merchant device 420 to the product description generator 410, which executes the generative language model 510. The generative language model 510 may be any type of natural language processing machine learning or deep learning model, for example: a recurrent neural network (RNN) model such as the long short-term memory (LSTM) model or the gated recurrent neural network, or a transformer model such as the Bidirectional Encoder Representations from Transformers (BERT) or the Generative Pre-trained Transformer (GPT) model.

The generative language model 510 may process the input 502 and return a first output 512. In some embodiments, the first output 512 may be an unmodifiable product description describing the product title of input 502. If the merchant entered one or more example product title and product description pairs as part of input 502, the generative language model 510 may analyze the example pairs such that the first output 512 resembles the one or more example descriptions in terms of wording, or grammar, or tone, or length, or flow, or any other characteristic possessed by the example product descriptions.

The first output 512 of the generative language model 510 may be generated sequentially, such that each next segment of the first output 512 may be the segment associated with the highest probability of being the next segment in the sequence. A segment may be a word, a phrase, a part of a word, a character, a punctuation mark, etc. Examples of a segment include, "we like the United Sta", "happy", "t's", and ", $$$". For each next segment chosen by the generative language model 510 to be the next segment of the first output 512, there may be at least one segment with a lower probability of being the next segment in the sequence and therefore not chosen to form part of the first output 512. For each next segment, generative language model 510 may store the at least one segment with a lower probability of being the next segment in a memory.

Once the generative language model 510 generates the first output 512, the first output 512 may then be fed into the natural language processor 520. In some embodiments, the natural language processor 520 may involve some sort of natural language processing and may include one or more machine learning models. The natural language processor 520 may process the first output 512 and identify one or more segments in the first output 512 as a candidate for modification.

A second output 522 may include the first output 512, for example the unmodifiable product description, with an indication that any candidate for modification as identified by the natural language processor 520 may be modified.

The second output 522 may further include, for each candidate for modification as identified by the natural language processor 520, an alternative word or phrase that may replace the candidate for modification in the second output 522. For example, the alternative word or phrase may be a segment that was determined by the generative language model to be associated with a lower probability for that segment of the first output 512, as indicated by arrow 514.

The second output 522 may be transmitted for presentation on the user interface 428 of the merchant device 420.

The generative language model 510 and the natural language processor 520 are described in greater detail below.

Figure 6:
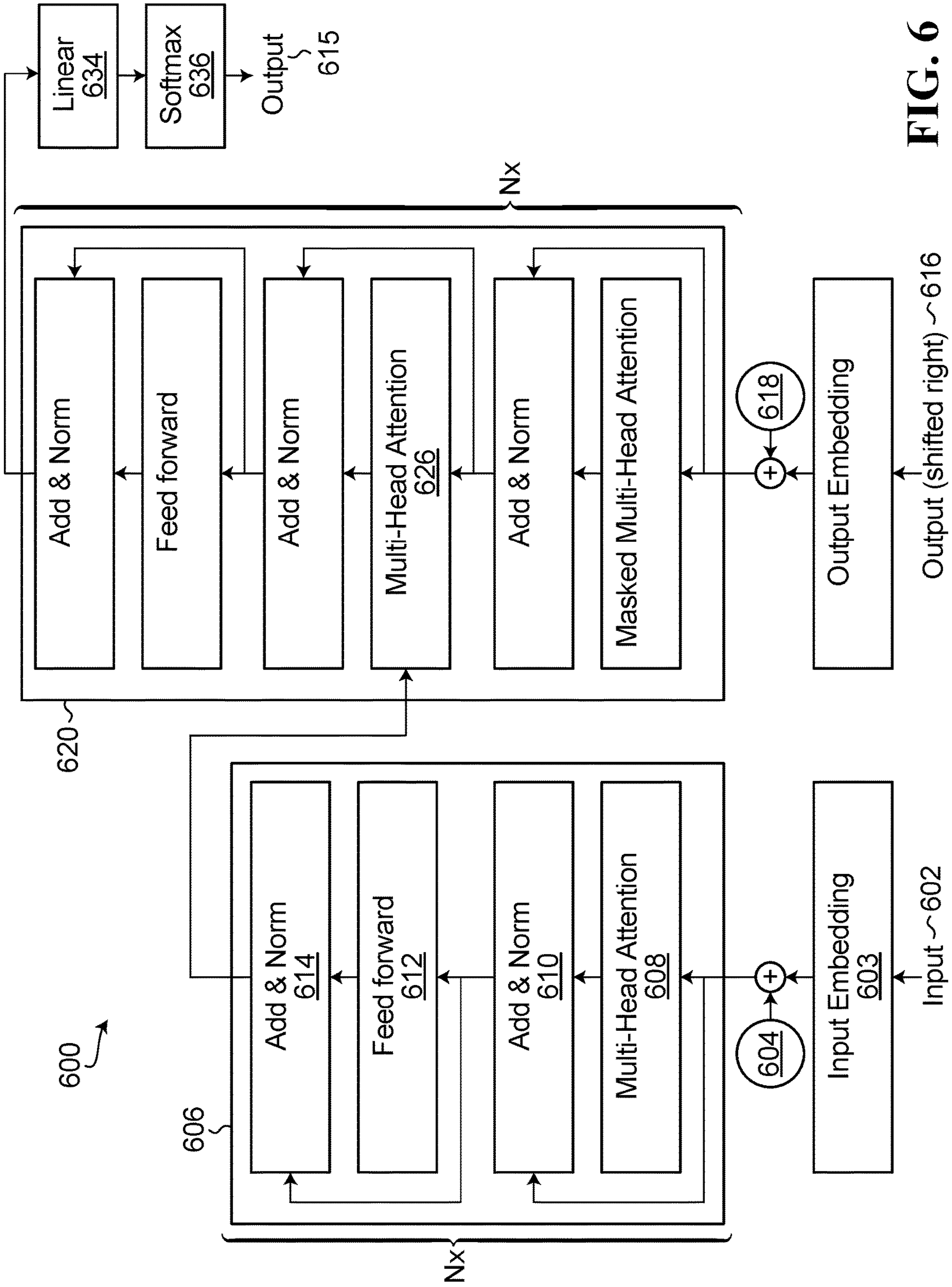
FIG. 6 illustrates a model architecture for a transformer model that may be used for generating a modifiable product description, according to some embodiments.

FIG. 6 illustrates a model architecture for a transformer model 600 which may be used as the generative language model 510 to generate a product description, according to some embodiments. A transformer model adopts the mechanism of self-attention, which allows it to differently weight the significance of each part of an input data. An example transformer machine learning model is the GPT-3™ developed by OpenAI. An overview of the transformer model 600 is as follows.

First, input 602 may be split into one or more tokens, where each token may be a word, multiple sequential words, a part of a word, a character, a punctuation mark, etc. A segment may also be equal to or based on a token. Each token of the input 602 is then fed into an input embedding layer 603. The function of the input embedding layer 603 is to map each token in the input 602 using an embedding algorithm to a respective vector representing the meaning of each token.

Unlike approaches in models such as RNNs which incorporate sequential processing to input data such that the model is implicitly aware of the position of each token in an input, for a transformer model such as the transformer model 600, input data is not necessarily processed in order, and the model is not aware of any positional order of the tokens of input 602. Therefore, positional encoding 604 is applied. To each respective vector created through the input embedding layer 603, a vector which indicates the relative position of each token is added. The outcome is a vector for each token in the input which contains both embedding and positional information.

The resultant vectors are then passed to an encoder block 606. The encoder block 606 includes a multi-head attention layer 608, a feed forward network 612, and add and norm layers 610, 614. The encoder block can be stacked N times, such that the process can be repeated N times, the output of each previous encoder block being used as the input for the next encoder block. The stacking of the encoder blocks may improve the performance of transformer model 600.

The multi-head attention layer 608 applies a mechanism called self-attention and produces self-attention vectors that indicate the relevance of each word of the input 602 to the other words of input 602. The multi-head attention layer 608 produces an output vector which determines for each word of input 602, which other words of input 602 are relevant to that word and thus how each word should attend to all other words of the input 602.

As indicated by the arrows flowing between the positional encoding 604 and the add and norm layer 610, the output vectors from the positional encoding 604 are delivered also to the add and norm layer 610. At the add and norm layer 610, the output of the multi-head attention layer 608 is added to the output vectors from the positional encoding 604, and a normalization operation is applied. The output vectors of the add and norm layer 610 are then fed into the feed forward network 612.

The feed forward network 612 transforms each of its input vectors into a linearized form that can be parsed by the next encoder block 606 or a decoder block 620. Then, at the add and norm layer 614, the input of the feed forward network 612 and the output of the feed forward network 612 are added and normalized.

Once these encoding steps are performed, the transformer model 600 may work to generate text sequences through the decoder block 620, an output embedding layer, positional encoding 618, a linear layer 634, and a softmax layer 636. Output 615 of the transformer model 600 is formed by output tokens and these output tokens are generated sequentially, meaning that the model 600 generates one output token after another until an end token is generated or until a local limit is reached (e.g. until 150 words are generated). At each decoding time step, the inputs to the decoder block 620 are the output of the encoder block 600 and the output tokens generated up to the previous decoding time step, i.e. output shifted right 616. For each decoding time step, the decoder block 620 can be stacked N times, such that the process can be repeated N times, the output of each previous decoder block being used as the input for the next decoder block.

Before each decoding time step, output shifted right 616 is embedded and positionally encoded and passed to the decoder block 620. The decoder block functions similarly to the encoder but contains an additional multi-head attention layer 626 (also called the encoder-decoder attention layer) which processes relevant information from the output of the encoder block 606 and directs the decoder block 620 to focus on relevant parts of the input 602.

The decoder block 620 outputs a vector which is passed to a linear layer 634. The linear layer 634 is a fully connected neural network that projects the output vector of the decoder block 620 into a larger logits vector. The logits vector is a $1 \times n$ matrix where n represents the number of distinct words in the model's vocabulary i.e., the words the model was exposed to during training. Each entry in the logits vector contains a score associated with the word at that index.

The softmax layer 636 then transforms the scores of the logits vector from the linear layer 634 into probabilities and outputs the token associated with the index of the cell containing the highest probability. In this way the model 600 is able to predict the next output token of output 615. A token associated with a lower probability may be stored and (as described herein) may be used as an alternative word or phrase by product description generator 410. As mentioned above, this process of generating output tokens is repeated until an end token is generated or until a local limit is reached.

Referring back to FIG. 5, the natural language processor 520 may be built, or an existing natural language processor may be further trained with training data, to be able to identify one or more words and/or phrases in the first output 512 as a candidate for modification. In some embodiments, the natural language processor 520 may be implemented using a machine learning model, such as a neural network. In some embodiments, training the natural language processor 520 may involve the following.

Certain terms may be chosen to form part of a dataset, and each term may be a word or a phrase. The terms may be chosen for their relation to commerce. For example, words or phrases such as "Egyptian cotton", "winter collection", "comfortable", or "limited edition" may be chosen to form part of the dataset. A set of classes may also be created to form part of the dataset. The classes in the set of classes may be commerce related. Examples of commerce-related classes that may be created to form part of the set of classes are "what product feels like", "what product looks like", "product material", "product catalog or sale information" or "where product can be worn". The set of classes may further include a "not commerce-related" class. Once the terms and classes are chosen, each of the terms may be labelled as corresponding to at least one class from the set of classes. For example, the term "Egyptian cotton" may be labelled as corresponding to the "product material" class, and the term "winter collection" as corresponding to the "product catalog or sale information" class.

The labelled terms may then be split into training, validation, and testing sets. As implied by the name, the training set may be used to train the natural language processor 520. Random values may be assigned to the weights and biases of the natural language processor 520, the weights and biases being the learnable parameters of the natural language processor 520. The training process may involve repeatedly feeding a term from the training set as input into the natural language processor 520, receiving the natural language processor's prediction of the corresponding class as output, comparing the natural language processor's prediction with the actual correct class associated with the term, and adjusting the values of the weights and biases to improve the accuracy of the natural language processor's future predictions. The weights and biases may continually be adjusted until the error of classification by the natural language processor falls below a desired threshold.

The natural language processor 520 may then be run on data from the validation set to optimize the natural language processor's hyperparameters, a hyperparameter being a parameter whose value is used to control the learning process, e.g., how many times the data from the training set are run through during training, or how much of an adjustment to the weights and biases should be made at each iteration.

After training, the natural language processor 520 may be run on data from the test set to evaluate the natural language processor's ability to predict the correct class when presented with terms that had not been used during training. Depending on the results, the natural language processor 520 may need to be further trained or tuned. Once the natural language processor 520 exhibits a desired performance for being able to predict the correct class, the natural language processor 520 may be used by the product description generator 410.

It is noted that the generative language model 510 may also undergo a training process similar to the one described above for the natural language processor 520, to tune the model 510 such that the first output 512 produced by the model is more relevant to commerce. For example, the generative language model 510 may be trained with training data which include texts corresponding to commerce-related products. The texts may be product descriptions, blog posts, social media posts, etc. associated with such products.

In some embodiments, rather than training the generative language model 510 on randomly selected product descriptions, the training data for the generative language model 510 may include product descriptions which have contributed to the market success of their respective products. For example, product title and product description pairs where the product descriptions have contributed to the market success of their respective products ("desirable product descriptions") may be chosen to form a dataset with which to train the generative language model. The training may involve repeatedly feeding a product title as input into the generative language model 510, receiving the generative language model's prediction of a product description associated with the product title as output, comparing the product description generated by the generative language model with the desirable product description paired with the product title, and adjusting the values of the weights and biases to improve the ability of the generative language model 510 to mimic the desirable product descriptions.

Market success relates to how well a product is received in a commercial market. The following is a non-limiting list of measurable metrics or parameters that may be indicative of the market success of a product:

- sales data, such as quantity and/or dollar amount of sales of the product and/or conversion rate;
- quantity of sales of the product relative to the total number of sales for similar products;
- pages views, including the number of customers that viewed the product (for example, the click-through rate of a website link associated with a product);
- average time customers spent viewing the product page;
- social media re-sharing of a product or a product page; and
- quantity and/or quality of positive reviews posted online associated with the product.

A product description may be determined to be a desirable product description where a high conversion rate of the product can be attributed to the time spent reading the description. For example, this metric may be inferred from the number of clicks on the product description (e.g. to expand the product description), or from page scroll data which indicate customers spent relatively longer on the section of the web page containing the product description. By choosing these desirable product descriptions to form part of the training data for the generative language model 510, the first output 512 may be a product description that is more likely to be of higher quality and contribute to the market success of a product, as when compared to a scenario in which the desirable product descriptions were not used to train the generative language model 510.

Figure 7:
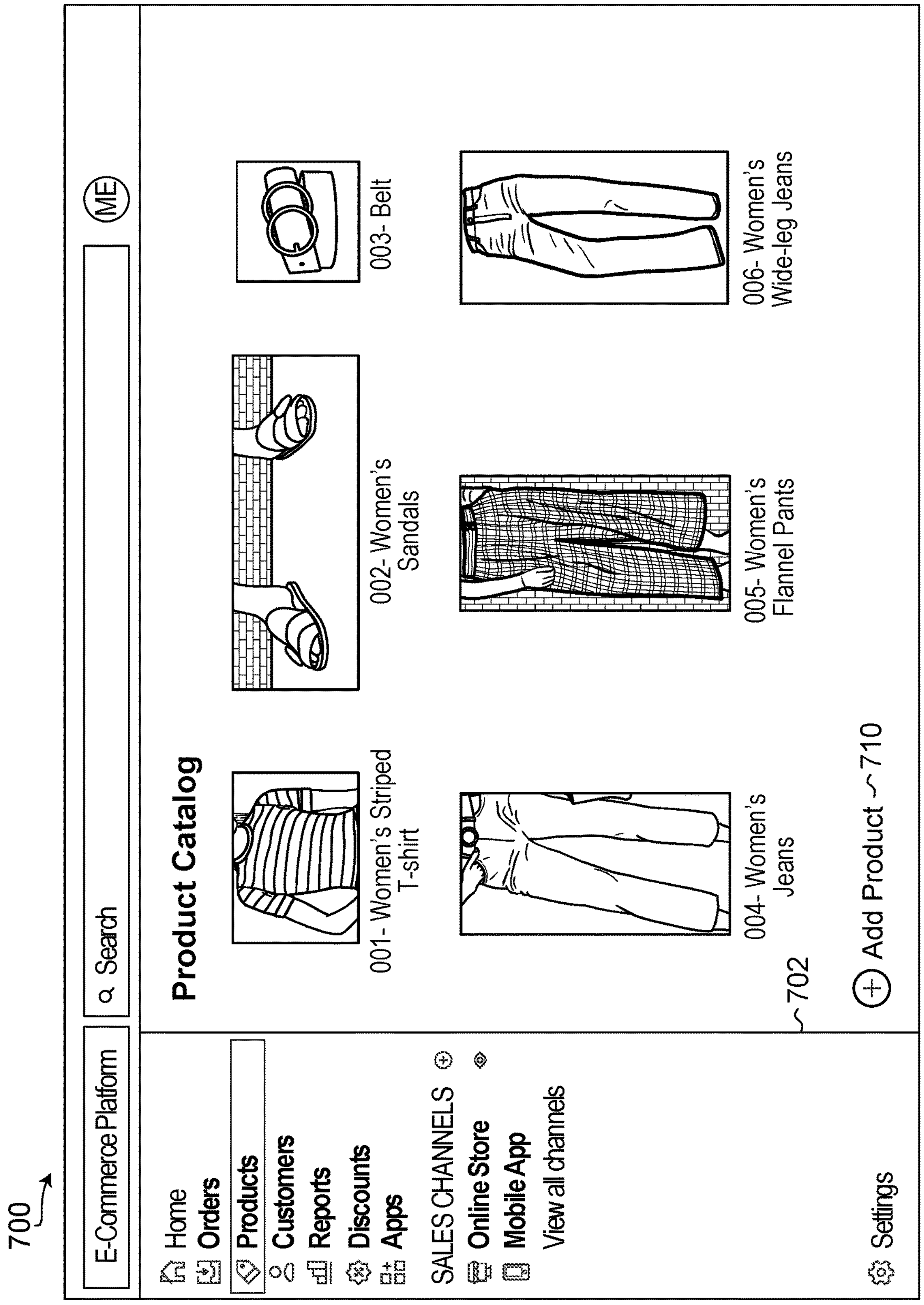
FIG. 7 illustrates a web page which may be provided to a merchant via a user interface of a merchant device, according to some embodiments.

FIG. 7 illustrates a web page 700 which may be provided to a merchant via the user interface 428 of the merchant device 420. The content of the web page 700 may be generated and transmitted to the merchant device 420. The web page 700 displays the product catalog of the merchant's online store. The product catalog may include a product title and a corresponding photo for each product sold through the merchant's online store. The product catalog may also include a product description for each product. A product's product description may be displayed on web page 700, or may be accessible by clicking on or hovering over the respective product title or photo on web page 700. The web page 700 may be accessible by the merchant by pressing a button having an icon and the text: "Products" in a navigation pane 702. Navigation pane 702 may be used by the merchant to access other web pages containing information about the merchant's online store, such as a home page which may provide information about tasks needed to be completed or an orders page which may show fulfilled and unfulfilled orders. The web page 700 may further include a clickable button 710 having the text: "Add Product". When the button 710 is selected, the merchant may be directed to a web page that allows for the merchant to add a new product to the product catalog.

Figure 8:
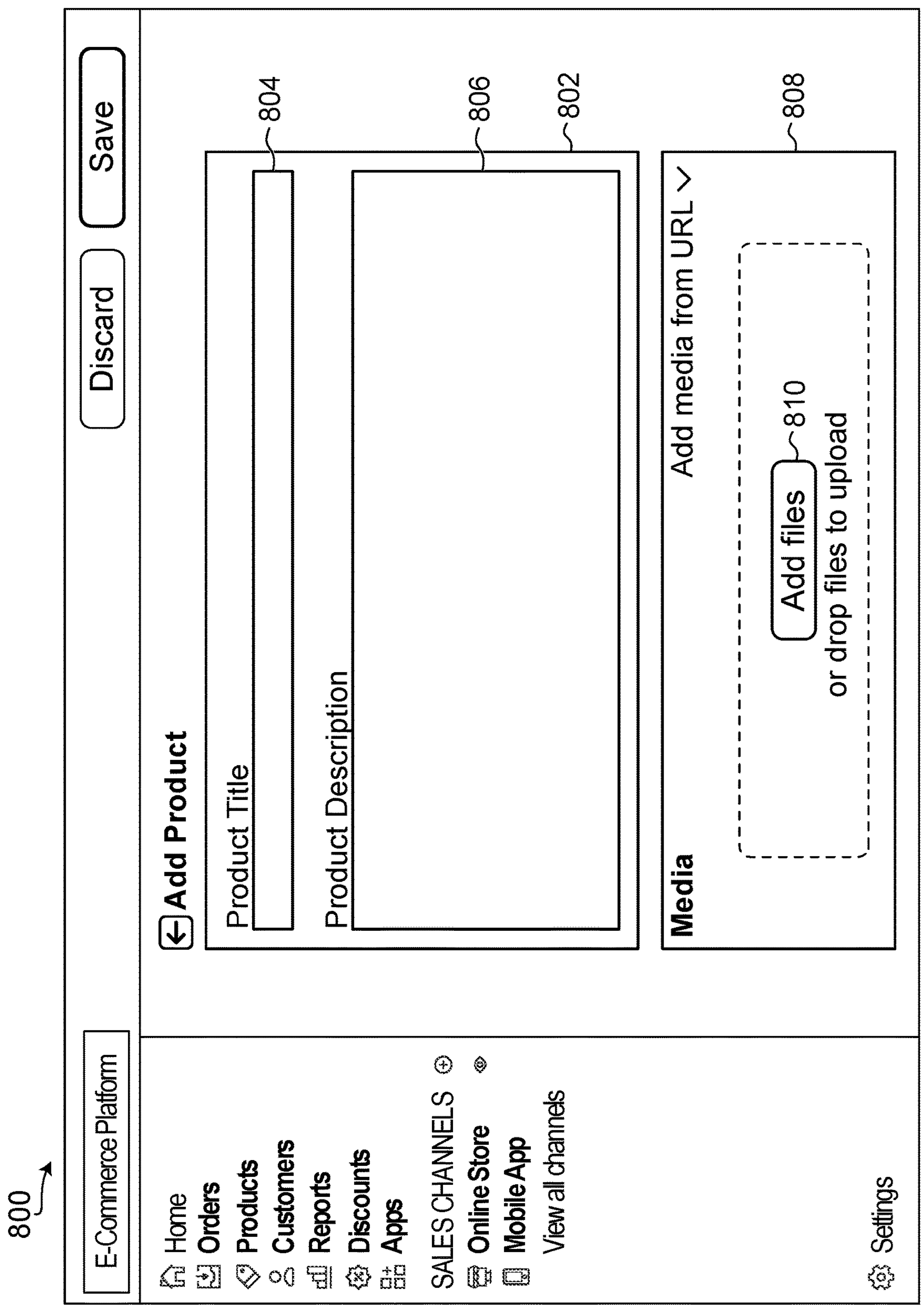
FIG. 8 illustrates another web page which may be provided to a merchant via a user interface of a merchant device, according to some embodiments.

FIG. 8 illustrates a web page 800 which may be provided to a merchant via the user interface 428 when the merchant clicks on the button 710, according to some embodiments. The web page 800 may display a product description generator box 802 which includes a prompt box 804 and a product description box 806. The product description generator box 802 may allow for the merchant to enter a prompt related to a product into the prompt box 804 and display an automatically generated modifiable product description in the product description box 806. The web page 800 may further display a media insertion box 808 which includes an "Add files" button 810.

In operation, a merchant may enter a prompt related to a product into the prompt box 804. The prompt may be the input 502. For example, the prompt may be or include a product title for which the merchant wants a modifiable product description generated, or it may be or include one or more example product title and product description pairs followed by a product title for which the merchant wants a modifiable product description generated.

When the merchant clicks elsewhere on the web page 800, i.e. somewhere on the web page other than the prompt box 804, a modifiable product description may be generated in the product description box 806. Alternatively, the webpage 800 may be equipped with another implementation to generate the modifiable product description, such as a clickable button.

To display the modifiable product description, the product description generator 410 may receive the entered prompt as input for the generative language model 510, process the prompt using the generative language model 510 to create a product description, feed the created product description into the natural language processor 520 to identify one or more segments of the created product description as being candidates for modification, for each segment identified as being a candidate for modification, receive from the generative language model 510 one or more alternative words or phrases that may replace the candidate for modification, and transmit for display in the product description box the created product description, with an indication that the any candidate for modification may be replaced with the one or more alternative words or phrases.

The media insertion box 808 may be used to upload a photo corresponding to the product for which the product description is generated ("product photo"). As illustrated in FIG. 8, to add the product photo the merchant may use the "Add files" button 810, drag and drop a file containing the product photo within the dashed line boundary in box 808, or use a Uniform Resource Locator (URL). Once the modifiable product description is generated, a button including the text "Save" may be clicked. Then, along with the product title, the photo may be displayed on web page 700.

Alternatively, the product photo may additionally or instead be processed and used to alter the modifiable product description, as will be explained in more detail below with reference to FIGS. 10 and 11.

Modifying a Modifiable Product Description in e-Commerce Platform 100

Figure 9:
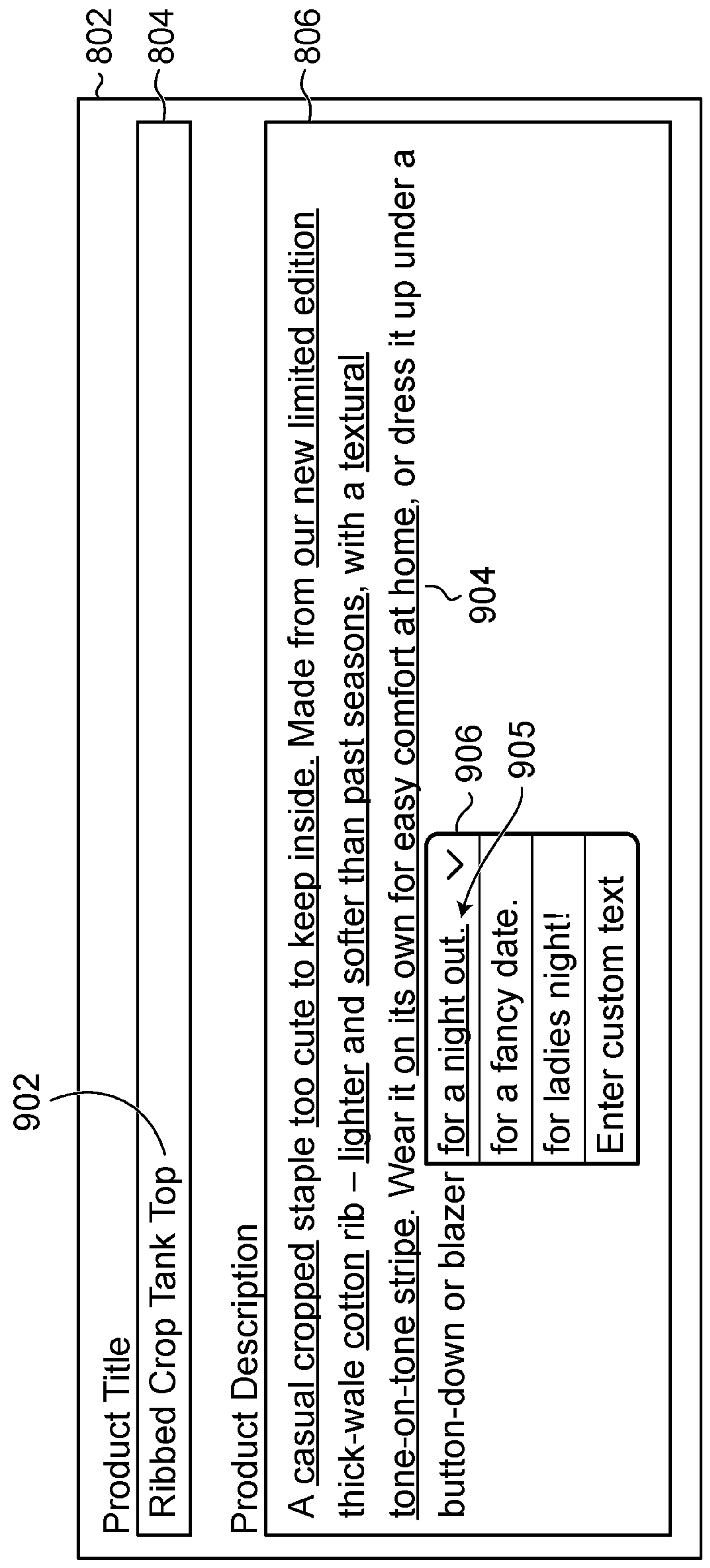
FIG. 9 illustrates a portion of the web page of FIG. 8 containing a modifiable product description, according to some embodiments.

FIG. 9 illustrates a portion of web page 800 wherein a modifiable product description has been generated, according to some embodiments. In this embodiment, a merchant has entered a product title 902, "Ribbed Crop Tank Top" into the prompt box 804, and a corresponding modifiable product description 904 was generated in product description box 806 by the production description generator 410. The product description 904 includes several candidates for modification, as shown by the lines running underneath the candidates for modification. Any words in the product description 904 that are not underlined may have been classified by the natural language processor as corresponding to the "not-commerce related" class. The use of a line to mark a candidate for modification is an example. In some embodiments, the text included in candidates for modification may instead be highlighted, be a different colour, be associated with a shape, etc.

For each of the candidates for modification, a dropdown menu (or other interactive user interface element) may be accessible by the merchant, the dropdown menu containing one or more alternative words or phrases generated and stored by the generative language model 510 that may replace the candidate for modification. One or more of the dropdown menus may also contain a field allowing the merchant to enter custom text.

For example, a candidate for modification 905 includes the text "for a night out". The candidate for modification 905 may have been identified by the natural language processor 520 as corresponding to a class of "where to wear product". A dropdown menu 906 may be accessible by the merchant for the candidate for modification 905. The dropdown menu 906 may be accessible by clicking on or near the text "for a night out." or may be accessible by other means such as hovering over the text "for a night out." The content of the dropdown menu 906 shows two phrases as alternative phrases for the candidate for modification 905.

In some embodiments, one or both of the alternative phrases may have been generated by the generative language model 510 as a possible phrase to be used at that portion of the product description 904 but associated with a lower probability and therefore stored in a memory of the generative language model 510 or the product description generator 410 instead. For example, the segment "for a night out." may have been determined by the generative language model as having the highest probability of being the segment at that portion of the product description 904, while the text "for a fancy date." may have been determined as having the second highest probability and the text "for ladies night!" as having the third highest probability of being the segment at that portion of the product description 904. In some embodiments, one or both of the alternative phrases may relate to the same class, i.e. in this case "where to wear product". In other embodiments, one or both of the alternative phrases may relate to a different class.

In some embodiments, one or both of the alternative phrases may have been generated using an image processor, as described in greater detail below.

For the generated product description 904, the merchant may decide that one of the alternative phrases is better suited for that portion of the description 904 than the candidate for modification. For example, the merchant may prefer the alternative phrase "for ladies night!". The merchant may indicate this preference, for example by clicking on or near the phrase "for ladies night!", which may result in the alternative phrase replacing the candidate for modification such that the last sentence of the product description 904 reads, "Wear it on its own for easy comfort at home, or dress it up under a button-down or blazer for ladies night!".

As mentioned above, a dropdown menu for a candidate for modification may also contain a field allowing the merchant to enter custom text, such as the one shown in the dropdown menu 906. This field may be used by the merchant if there is a word or phrase other than the alternative words or phrases displayed in a dropdown menu for a candidate for modification which is preferred by the merchant instead of the candidate. For example, for the candidate for modification 905, the merchant may prefer that portion of the product description 904 to be, "to stand out at your next party!". The merchant may enter this preferred phrase in the custom text field of the dropdown menu 906 such that the last sentence of the product description 904 reads, "Wear it on its own for easy comfort at home, or dress it up under a button-down or blazer to stand out at your next party!".

In some embodiments, the one or more of the candidates for modification might not be associated with a dropdown menu containing a field, but may still be modifiable by the merchant with custom preferred text (e.g., the merchant may be able to simply delete the text of a candidate for modification from a generated product description and enter a custom preferred word or phrase in its place).

In some embodiments, a feedback loop based on such a custom preferred word or phrase entered by a merchant, may be included in and implemented by the product description generator 410. For example, the custom preferred word or phrase may be used to update or re-train the generatively language model 510 such that the model 510 associates the custom preferred word or phrase with a higher probability as being, or forming part of, a next segment of a generated product description. Alternatively, the product description generator 410 may store the custom preferred word or phrase in its memory 414 and may subsequently replace a word or phrase of the first output 512 or the second output 522 with the custom preferred word or phrase.

Although two alternative phrases are displayed in the dropdown menu 906, in some embodiments, one alternative word or phrase, or more than two alternative words or phrases, may be displayed. Although alternative words or phrases for each candidate for modification are described as being listed in a dropdown menu, other methods of displaying the alternative words or phrases are possible. For example, the alternative words or phrases may appear one at a time and provide the merchant with a mechanism to go through each alternative. Although the dropdown menu 906 appears in product description box 806 of the web page 800, in some embodiments it may appear elsewhere. For example, the dropdown menu may appear elsewhere on web page 800, or may appear on a separate web page (e.g., the candidate for modification may be made clickable, and once clicked the merchant may be directed to a separate web page displaying the alternative words or phrases).

Figure 10:
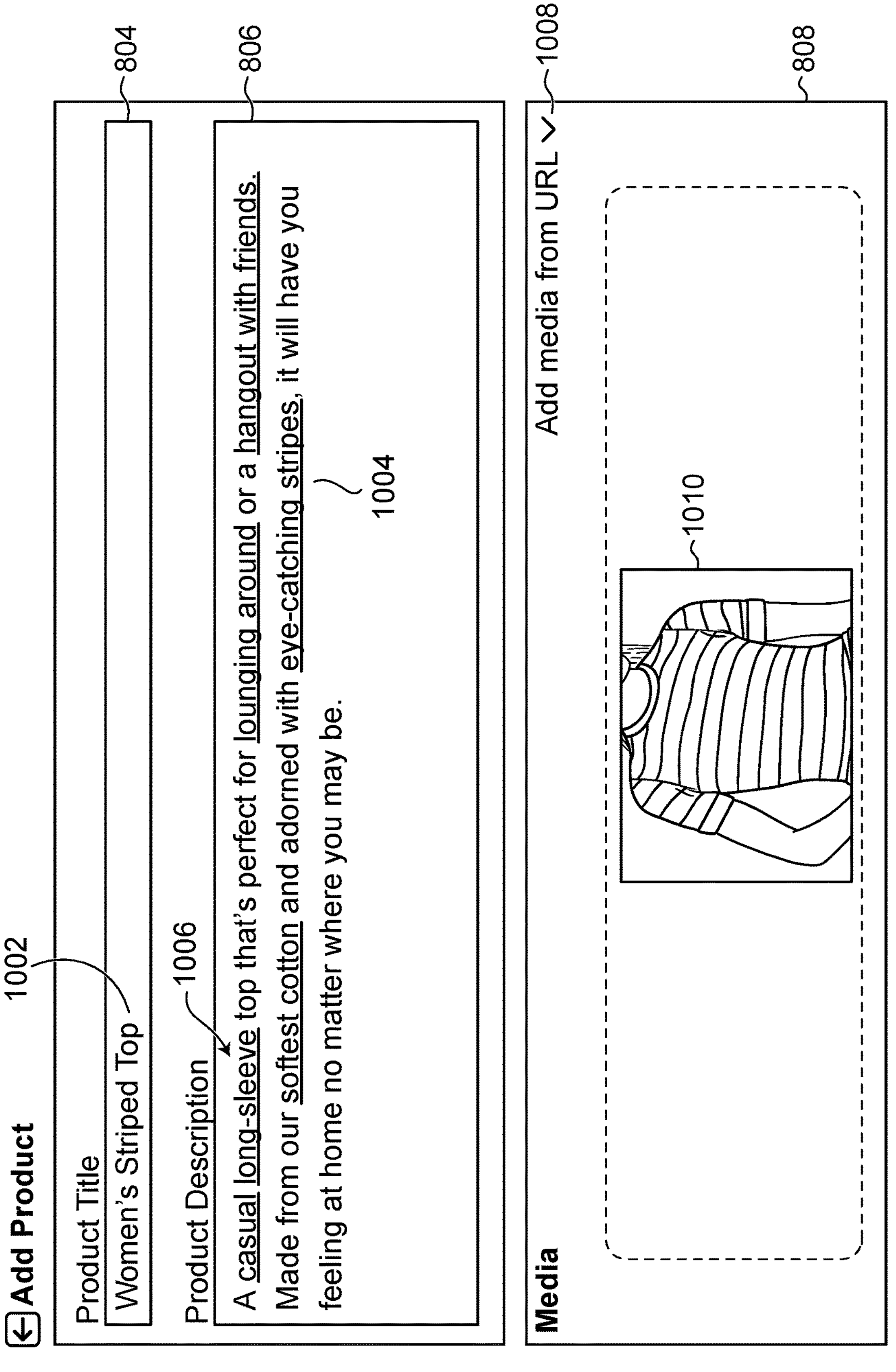
FIG. 10 also illustrates a portion of the web page of FIG. 8 containing a modifiable product description, according to some embodiments.

FIG. 10 illustrates another portion of web page 800 wherein a modifiable product description has been generated, according to some embodiments. In FIG. 10, a merchant has entered a product title 1002, "Women's Striped Top" into the prompt box 804, and a corresponding modifiable product description 1004 was generated in the product description box 806 by the production description generator 410. The product description 1004 includes several candidates for modification, as shown by the lines running underneath the candidates for modification. In particular, the product description 1004 includes a word "long-sleeve" 1006. The word 1006 may be a candidate for modification, as shown in FIG. 10. For example, the word 1006 may have been identified by the natural language processor 520 as corresponding to a class like "what product looks like". Alternatively, the word 1006 might not be a candidate for modification.

The merchant may also decide to upload a photo 1010 of the product with which the product title is associated. Photo 1010 may therefore be a photo of a women's striped top sold, or to be sold, by the merchant. The photo 1010 may be uploaded by the merchant in various ways, for example by selecting the "Add files" button 810 (not shown), by dragging and dropping the photo 1010 into the dotted boundary line in media insertion box 808 as shown in FIG. 10, or by using a URL as indicated by 1008.

The merchant may decide to upload the photo 1010 for various reasons. The merchant may wish for the photo 1010 to be displayed with the product title 1002 in the product catalog of web page 700 of the merchant's online store. Additionally, the merchant may wish for image processing to be performed on the photo 1010, which may subsequently lead to the product description 1004 being modified.

Image processing may be performed on a photo uploaded using the media insertion box 808, for example the photo 1010, by an image processor. The methods described as being performed by the image processor may be implemented by the processor 412, retrieving data and executing instructions stored from memory 414 as needed. In some embodiments, the image processor may be a trained machine learning model. After receiving the uploaded photo, the image processor may be capable of extracting relevant features of the product depicted in the photo. Relevant features may include type of product, shape, length, colour, or pattern. For example, for a clothing product, the image processor may be able to determine the type (e.g., top, pants, shoes, socks, etc.), shape (e.g. V-neck, shawl collared, wide-legged, etc.), length (e.g., short-sleeve, sleeveless, mid-thigh, etc.), colour (e.g., red and green, tone-on-tone, etc.), or pattern (e.g., zig-zag, striped, polka dotted, etc.) of the product. For the women's striped top depicted in the photo 1010, the image processor may be able to identify that it is a striped short-sleeve top with a round neck.

The product description generator 410 may receive information associated with the features identified by the image processor. For example, the product description generator 410 may receive that the product title "Women's Striped Top" 1002 is related to a product which is striped, short-sleeve, and has a round neck. The characteristics of striped, short-sleeve, and round neck may have been identified by the image processor performing image analysis on the photo 1010. The product description generator 410 may then process the modifiable product description and identify portions in the modifiable product description that can be modified using the words or phrases received from the image processor.

The product description generator 410 may be able to recognize an inconsistency between one or more words already present in a modifiable product description and one or more words received from the image processor. In such a case, the product description generator 410 may identify the one or more words of the modifiable product description as an inaccuracy and therefore a portion to be modified using the information received from the image processor.

Figure 11:
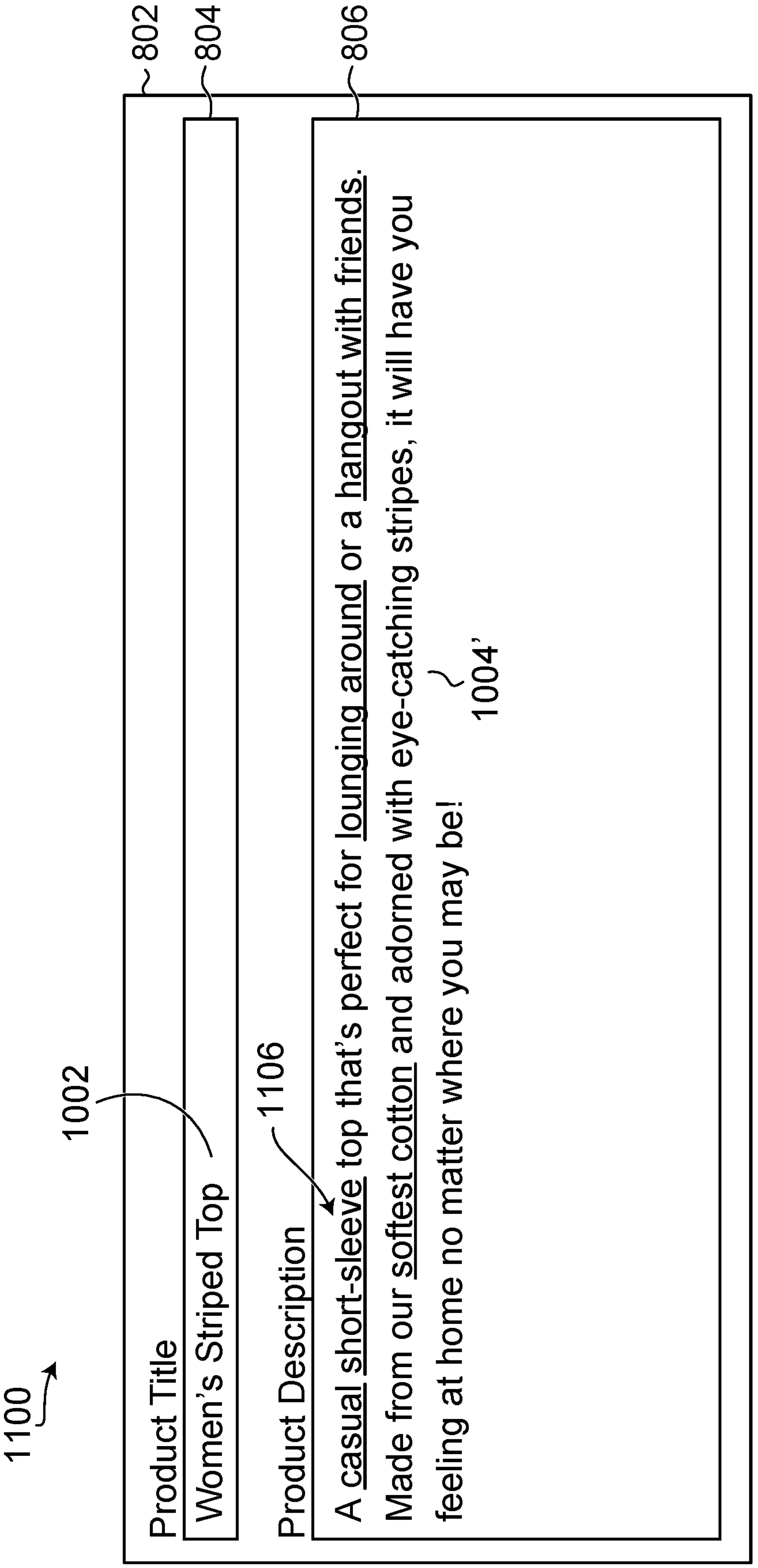
FIG. 11 illustrates the modifiable product description of FIG. 10 that has been modified following image processing, according to some embodiments.

For example, FIG. 11 illustrates an embodiment wherein the modifiable product description 1004 has been modified following image processing of the photo 1010, to result in a modified product description 1004'. The modified product description 1004' includes a word "short-sleeve" 1106, and it is evident that the word "short-sleeve" 1106 has replaced the word "long-sleeve" 1006 of the modifiable product description 1004.

In some embodiments, instead of or in addition to replacing one or more words or phrases of a product description, the image processing may be used to add one or more words or phrases to the product description. For example, the product description generator 410 may add that the product has a round neck shape, which may give a more comprehensive description of the product to a customer.

In some embodiments, the information received from the image processor may be used by the product description generator 410 to generate an alternative word or phrase to a candidate for modification instead of replacing or adding to a modifiable product description outright. For example, in the embodiment shown in FIG. 10 where the word "long-sleeve" 1006 is a candidate for modification, instead of replacing the word 1006 with the word "short-sleeve" 1106 the product description generator 410 may instead list the word "short-sleeve" as an alternative word in a dropdown menu for the word "long-sleeve". This has the technical benefit of accommodating image processing that may sometimes be suboptimal, e.g. such that it is not with 100% certainty that the shirt in the image is "short-sleeve". Rather than modifying the description to automatically replace "long-sleeve", the option of "short-sleeve" is displayed as an alternative and user input by the merchant may instruct whether or not to select "short-sleeve" in place of "long-sleeve".

The modified product description 1004' may of course be further modified by the merchant by replacing any candidate for modification in the modified product description 1004' with an alternative word or phrase provided by the product description generator 410 or a custom word or phrase chosen by the merchant in a similar way as described with reference to FIG. 9.

In some embodiments, the product description generator may receive information relating to relevant features from the image processor before generating the product description. For example, a merchant may be prompted to upload a product photo before inputting a prompt in the prompt box 804. After the image processor extracts the relevant features about the product, information related to the relevant features may be fed to the generative language model 510 (i.e., in addition to or as part of the input 502). The generative language model may use the information received from the image processor when generating one or more of the segments of the product description. This may help to reduce the number of inaccuracies or errors outputted by the generative language model. For example, even though the word "long-sleeve" may be a segment associated with the highest probability, with the information received from the image processor, the generative language model 510 may output the word "short-sleeve" for that segment of a product description.

Figures 12A, 12B:
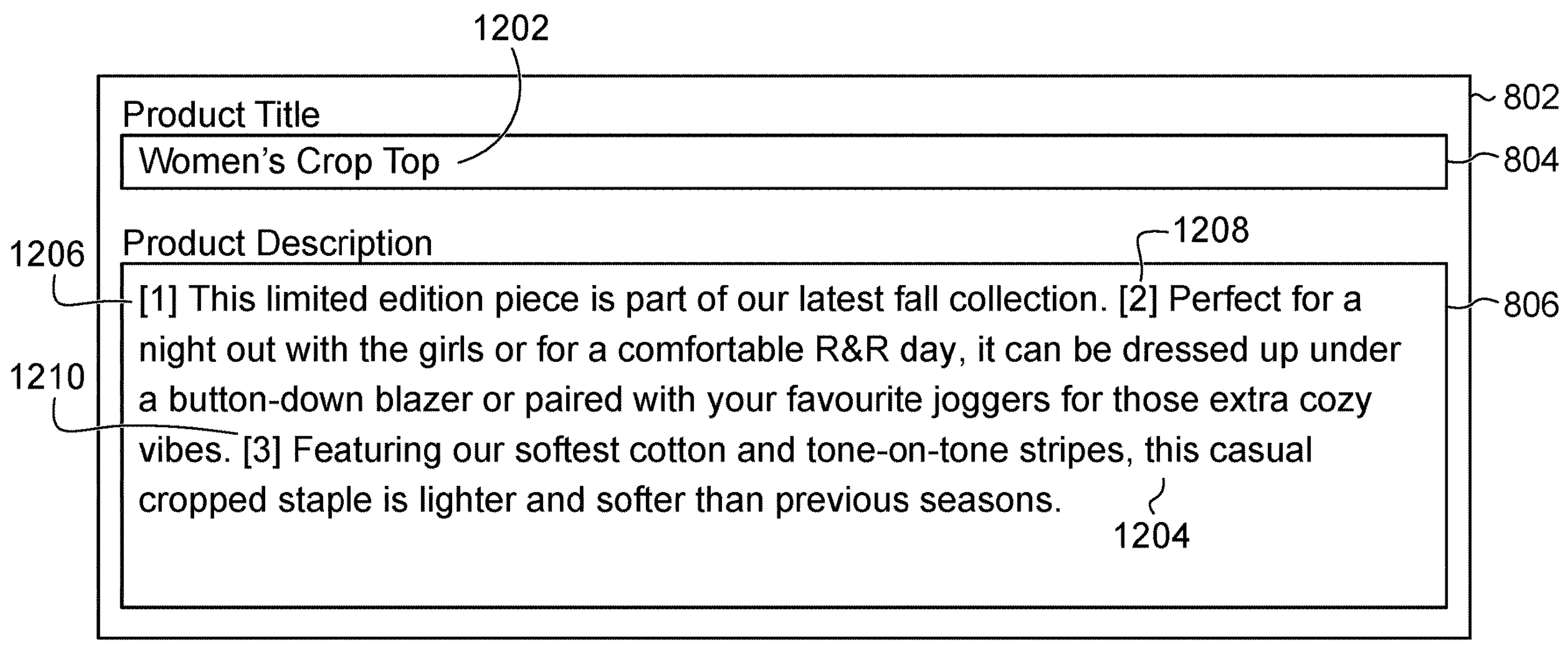
FIG. 12A also illustrates a portion of the web page of FIG. 8 containing a modifiable product description, according to some embodiments.
FIG. 12B illustrates a table which may be used to arrange or rearrange the order of sections of a modifiable product description, according to some embodiments.

In some embodiments, the product description generator 410 may allow a merchant to have increased control over the order of various sections of the product description. FIG. 12A illustrates a modifiable product description generated on web page 800 according to some embodiments. In FIG. 12A, a merchant has entered a product title 1202, "Women's Crop Top" into the prompt box 804, and a corresponding modifiable product description 1204 was generated in the product description box 806 by the production description generator 410. The product description 1204 may include several candidates for modification.

The product description 1204 is made up of a first section 1206 which includes the text between the "[1]" and the "[2]", a second section 1208 which includes the text between the "[2]" and the "[3]", and a third section 1210 which includes the text following the "[3]". The first, second, and third sections of the product description 1204 may be rearranged by a merchant, for example by dragging and dropping the sections to their desired positions. For example, the merchant may prefer the last sentence (the third section) of the product description 1204 to go after the first sentence (the first section). The merchant may therefore drag and drop the third section 1210 until it is positioned between the first section 1206 and the second section such that the product description 1204 instead reads:

"This limited-edition piece is part of our latest fall collection. Featuring our softest cotton and tone-on-tone stripes, this casual cropped staple is lighter and softer than previous seasons. Perfect for a night out with the girls or for a comfortable R&R day, it can be dressed up under a button-down blazer or paired with your favourite joggers for those extra cozy vibes."

Other methods of rearranging the sections are possible. For example, instead of dragging and dropping a section of the product description directly within the product description box 806, a merchant may be presented with a table which lists each section of the product description and a respective category associated with the section. The merchant may alter the order of the table, for example by dragging and dropping the rows of the table, until a desired order is achieved. Each respective category associated with the sections may be related to the set of classes used by the natural language processor 520.

For example, FIG. 12B illustrates a table 1200 which may be used by a merchant to customize the order of the first, second, and third sections 1206, 1208, 1210, according to some embodiments. The table 1200 may be displayed on the web page 800. The product description generator 410 may determine a respective category for a section according to the class corresponding to a candidate for modification in the section. For example, for the first section 1206 of the product description 1204, the natural language processor 520 may have identified the text "latest fall collection" as corresponding to a "product catalog or sale information" class and subsequently labelled the text as a candidate for modification. Therefore, the product description generator 410 may assign a "sale/catalog information" category to the first section 1206. If a section has multiple candidates for modification such that it is associated with multiple classes, there may be rules in place such that the product description generator 410 can select one class of the multiple classes to represent that section. For example, the third section 1210 may have the text "softest cotton" as a candidate for modification corresponding to the "what product feels like" class, and the text "previous seasons" as a candidate for modification corresponding to the "product catalog or sale information" class, and the description generator 410 may select, according to a defined set of rules, the category of "material" to represent the third section.

Before a product description is even generated, a merchant may have a preference as to its layout, i.e., the merchant may prefer for the product description to contain certain information before others from the outset. Therefore, in some embodiments, a merchant may be able to customize the order of sections of a modifiable product description before the product description is generated, a section being one sentence or a group of sentences. The order of the sections may be customizable according to a plurality of defined categories. The plurality of categories may relate to one or more of the classes used by the natural language processor 520. For example, a merchant may wish for the first section of a product description to contain product catalog or sale information, followed by a section describing where the product may be worn, and finally a section describing what the product feels like. Web page 800 may display a table similar to the table 1200 of FIG. 12B, which may allow the merchant to choose within a list of categories to communicate the merchant's preferred order of the content for the generated modifiable product description. For example, the merchant's preferred order may be as listed in the table 1200.

Upon receiving the merchant's preferred order, the product description generator 410 may generate a modifiable product description according to the following process. The generative language model 510 may take as input a product title entered into prompt box 804 and generate a product description as the first output 512, this product description having first, second, and third sections. As mentioned previously, for each sequential segment generated by the model 510, there may be one or more segments that may have been selected as the segment for that portion but for the determination that the one or more segments had a lower probability of being the best segment than the segment ultimately chosen. These one or more segments may be stored in the memory of the generative language model. For example, the first section of the generated product description may be a sentence containing a segment with the text "perfect for a night out." For this segment, the text associated with the second highest probability and therefore stored in memory may be "from our latest summer collection."

The merchant's preferred order may then be fed to the natural language processor 520, for example in addition to the generated product description. The natural language processor 520 may process the first section of the generated product description to identify candidates for modification and assign a category which relates to the candidate for modification to that section. If there are multiple candidates for modification and thus multiple possible categories, the product description generator 410 may select one category to represent that section according to a defined set of rules. For the example above, the first section of the description may be assigned the category "location/setting context" due to "perfect for a night out" being identified as a candidate for modification. If the assigned category is the same as the merchant's desired category for the first section, the natural language processor 520 may move on to process the second section. However, if the assigned category is not the same as the merchant's desired category for the first section, the natural language processor 520 may process the one or more segments that were stored in memory for being associated with a lower probability.

For the current example, the assigned category for the first section of "location/setting context" is not the same as the "sale/catalog information" category desired by the merchant. Therefore, the natural language processor 520 may process the segment associated with the second highest probability, i.e., "from our latest summer collection," and determine that the category associated with it is "sale/catalog information" and that this category is the same category as the merchant's desired category for the first section. The segment "perfect for a night out" may then be replaced with "from our latest summer collection" for the first section of the product description. If the segment associated with the second highest probability was also not associated with the merchant's desired category, the segment associated with the third highest probability would be processed, and so on, until the segment associated with the desired category was found. The above process would be repeated for the second and third sections of the product description as well, until the merchant's preferred order is reflected by the content of the product description sections.

Once generated and displayed according to the merchant's preferred order, the merchant may be given the ability to further customize the layout of the modifiable product description, for example by dragging and dropping the sections as described with reference to FIG. 12A.

Additional Variations, Embodiments, and Methods

In some embodiments, a customer's search query may be used in determining the content of a product description that is displayed to the customer.

A customer may visit an e-commerce platform which includes the merchant's online store, or may visit the merchant's online store, using the customer device 430. The e-commerce platform or the merchant's online store may be equipped with a search bar allowing the customer to enter a search query. For example, the customer may want to find a cocktail dress for an upcoming work party, and thus may enter "work party cocktail dress" as the query into the search bar. A search results page may be transmitted to the customer device 430 and loaded on the user interface 438, the results page containing product titles and product photos which best match the customer's query. The customer may find a specific product title or product photo to be of interest, and may select that product title or product photo to be directed to a product page pertaining to the particular product.

According to some embodiments, at the time of product description generation (e.g., at the time a merchant inputs a product title in the prompt box 804 on web page 800), the product description generator 410 may generate a plurality of potential product descriptions for a product, e.g., the processes described above with respect to creating a product description may be repeated an X number of times to generate an X number of potential product descriptions. There may be a process to ensure that each of the potential product descriptions are different from each other. The potential product descriptions may be stored in a memory of the generative language model 510 or the product description generator 410. At or near the time the customer selects the product title or product photo of a product, a similarity score may be calculated between the search query and each of the potential descriptions. The potential product description associated with the highest similarity score may be chosen as the product description to be displayed on the product page. For example, one potential product description may describe a dress as "an awesome choice for brunch with the girls" whereas another potential product description may describe the dress as "the ultimate go-to for your next work social." The latter potential product description may be associated with a higher similarity score with the user's search query and therefore chosen to be displayed to the customer on the product page.

According to some embodiments, at the time that the customer selects the title or photo of the particular product, the product description generator 410 may generate a product description utilizing the search query. Alternatively, the product description generator 410 may generate the product description at the time the customer submits the search query.

For example, using the search query, in addition to the product title (e.g., "women's midi dress"), as the input for the generative language model 510, the generated product description may include text like "This cocktail dress is perfect for your next work party," whereas without using the search query, the description for that portion may have been "This midi dress is perfect for your next night out." This product description may be the final product description, or may be modified using the product photo and the image processor, as described with reference to FIGS. 10 and 11 above. Along with the product title and product photo, the final product description may be displayed to the customer on the product page. The process of generating and displaying the product description in this way may take a similar amount of time as it takes to load a web page on the user interface 438 of the customer device 430, such that it may be performed in near-real time in the context of web browsing. Moreover, advantageously, the displayed product description may be better tailored to the kind of product that the customer is searching for, and as a result may increase the market success of a product.

It is noted that in addition to using the customer search query, the product description may also be modified using other information, such as the time of year. For example, the product description generator 410 may recognize that a customer's search query of "work party cocktail dress" is submitted close to or in December. Therefore, the generated product description may include text describing the product as being "ideal for your next holiday party," for example.

In some embodiments, a customer's search query may be used to determine from a plurality of potential product descriptions, which product description will be displayed to the customer on the customer device 430. For example, A/B testing or split testing may be performed in order to determine the product description to be permanently displayed on the merchant's online store for a particular product. A/B testing refers to a randomized experimentation process wherein two or more versions of a variable are compared by testing the response to each version. The plurality of product descriptions may be displayed to different groups of customers who visit the product page for the product at the same time, to determine the product description version associated with the best business metric result and choose that version as the ultimate version. For example, the version that resulted in the highest conversion rate of the product may be determined as the ultimate version and thus may be permanently displayed on the merchant's online store for the product.

As discussed elsewhere in the application, in some embodiments the input 502 may include example product titles and/or example product descriptions, the example product descriptions being preferred by a merchant, and the product description generator 410 may subsequently generate a product description that possibly has fewer inaccuracies and/or is more consistent with a preferred style of the merchant. In some embodiments, the product description generator 410 may additionally, or instead, generate and use a plurality of possible product descriptions in order to generate a product description more consistent with the preferred style of the merchant. For example, when a merchant enters text, e.g., a product title, in the prompt box 804 on web page 800, the product description generator 410 may generate and display to the merchant a plurality of possible product descriptions for a product. The product description generator 410 may provide a mechanism by which the merchant can indicate one or more product descriptions from the plurality of possible product descriptions which are preferred by the merchant. The merchant may favour the one or more preferred possible product descriptions over the other possible product descriptions due to the wording, or grammar, or tone, or length, or flow, or any other characteristic possessed by the one or more possible product descriptions.

The product description generator 410 may then use one of the one or more possible product descriptions as the output 512 to be processed by the natural language processor 520. The product description generator 410 may further or instead include the one or more possible product descriptions as part of the input 502 for a different product description to be generated by the product description generator 410, and this different product description may be more consistent with a preferred style of the merchant.

In some embodiments, this process of generating, and prompting a merchant to indicate preferred description(s) from, a plurality of possible product descriptions, may be performed before a merchant enters text in the prompt box 804. For example, the merchant may enter a product title into a different prompt box (not shown) and be provided with a plurality of possible product descriptions on the user interface 428. The merchant may indicate one or more preferred possible product descriptions of the plurality of possible product descriptions. This process may be performed a Y number of times, for example by allowing the merchant to enter Y different product titles. When the merchant enters text into the prompt box 804, the product description generator 410 may take into consideration the preferred possible product descriptions and, as a result, be able to generate a product description that is more consistent with the preferred style of the merchant.

In some embodiments, information relating to other products sold on the e-commerce platform 100 or on the merchant's online store may be used when generating a modifiable product description. For example, a merchant may use web page 800 to be provided with a modifiable product description for a particular product, e.g., a T-shirt. The product description generator 410 may receive information related to the merchant's other products; in particular, the product description generator 410 may receive information that of the 42 other T-shirts sold by the merchant, 39 are made with cotton. Alternatively, the product description generator 410 may receive information related to other products sold on the e-commerce platform 100, in particular that the majority of the other T-shirts sold on the e-commerce platform are made with cotton. The information may be stored in the e-commerce platform, e.g. in product descriptions, or in the portion of memory storing information related to product features (e.g. the portion of memory storing "product material"). The generative language model 510 may process this information to generate a word or phrase describing the shirt being made of cotton as part of the product description. Alternatively, the modifiable product description for this product may include a word or phrase describing the product as being made of cotton, as an alternative to a candidate for modification, for example in a dropdown menu.

FIG. 13 illustrates a computer-implemented method, according to some embodiments. The method may be performed by or on an e-commerce platform, although this is not necessary. The steps are described as being performed by the processor 412 of product description generator 410 of FIG. 4, but this is only an example. For example, the method may instead be performed by another entity, which might or might not be part of an e-commerce platform.

At step 1302, the processor 412 may generate a product description associated with a product.

In one example, the processor 412 may use a generative language model, such as generative language model 510, to generate the product description. An example product description is the product description 904 of FIG. 9. Generating the product description using the generative language model 510 may involve receiving a prompt having text corresponding to the product, and inputting the prompt into the generative language model. An example of a prompt having text corresponding to a product is the product title 902 of FIG. 9. A prompt having text corresponding to a product may also or instead include an example product title and/or example product description, as described above.

In some embodiments, the generative language model 510 may sequentially output segments of the production description, each next segment determined by the generative language model as being associated with a highest probability of being the next segment. An example of such a segment may be the text "thick-wale cotton rib" in the product description 904.

At step 1304, the processor 412 may process the product description to identify at least a word or phrase in the product description as a candidate for modification.

In one example, the processor 412 may use the natural language processor 520 to identify the candidate for modification. An example candidate for modification is the text "for a night out." in the product description 904.

At step 1306, the processor 412 may provide content for presentation, the content including the product description and an alternative word or phrase that may be substituted in place of candidate for modification. The content for presentation may be a modifiable product description. An example of a modifiable product description is the product description 904 of FIG. 9.

In one example, the alternative word or phrase that may be substituted in place of the candidate for modification may be a particular word or phrase that was determined by the generative language model as being associated with a lower probability of being the next segment and not used to form part of the product description. For example, in FIG. 9, the text "for a fancy date" shown in dropdown menu 906 may be an alternative phrase that was determined by the generative language model as being associated with a lower probability of being the next segment when compared to the phrase "for a night out" and therefore not used to form part of the product description 904.

In another example, the alternative word or phrase that may be substituted in place of the candidate for modification may be determined based on use of the alternative word or phrase in relation to other products. For example, as mentioned above, if most of the shirts sold by a merchant may be made of cotton, the alternative word or phrase may be related to the material cotton.

In some embodiments, the processor 412 may train a generative language model, such as generative language model 510, using training data, the training data including text corresponding to a different product. The different products may be associated with market success. After training, the processor 412 may use the generative language model 510 to generate the product description associated with the product, and the content for presentation may include the product description.

In some embodiments, the processor 412 may receive an indication of an order in which a plurality of sections of the product description are to be arranged relative to each other. The processor 412 may generate or modify text of the product description to obtain the product description arranged in the order indicated. The content for presentation may then include the product description arranged in the order indicated.

In some embodiments, the processor 412 may further process an image depicting the product to obtain an attribute related to the product as depicted in the image, and include in the content, a particular word or phrase associated with the attribute.

In one example, the processor 412 may further process an image, such as a product photo, depicting the product using the image processor mentioned above. An example of a product photo is the photo 1010 of FIG. 10. An example of an attribute related to the product is the top depicted in photo 1010 having short sleeves, and a word associated with the attribute is the word "short-sleeve" 1106 shown in FIG. 11.

The processor 412 may further modify the product description to include the particular word or phrase associated with the attribute. For example, in FIG. 11, it is evident that the product description 1004 was modified to include the word "short-sleeve" 1106. In some embodiments, the alternative word or phrase that may be substituted in place of the candidate for modification may be the particular word or phrase associated with the attribute, e.g., the word "short-sleeve" 1106 may also or instead have been listed as an alternative word for the word "long-sleeve" 1006 in a dropdown menu.

In some embodiments, the processor 412 may generate a plurality of product descriptions associated with a product. For example, the processor 412 may use generative language model 510 to generate ten product descriptions associated with a product. The ten product descriptions may be stored in a memory, for example the memory of the generative language model 510 or the product description generator 410. The processor 412 may then transmit for display on another user interface, a particular product description of the plurality of product descriptions, the particular product description being selected based on a user query.

For example, a customer may enter a user query "work party cocktail dress". A search results page may be transmitted to a customer device, e.g. customer device 430, and loaded on a user interface of the customer device, e.g., user interface 438. The results page may contain product titles and product photos which best match the query. At or near the time the customer selects the product title or product photo of a product, a similarity score may be calculated between the query and each of the potential descriptions. One potential description may describe the selected product as "an awesome choice for brunch with the girls," whereas another potential description may describe the selected product as "the ultimate go-to for your next work social." The latter potential description may be determined to have a higher similarity score to the query than the former potential description. The processor 412 may then transmit for display on the user interface 438, the particular product description associated with the highest similarity score.

FIG. 14 illustrates a computer-implemented method, according to another embodiment. The method may be performed by or on an e-commerce platform, although this is not necessary. The steps are described as being performed by the processor 412 of product description generator 410 of FIG. 4, but this is only an example. For example, the method may instead be performed by another entity, which might or might not be part of an e-commerce platform.

At step 1402, the processor 412 may train a generative language model using training data, the training data including text corresponding to a product. The product may have been determined to be associated market success. In one example, the generative language model may be a machine learning model, an example of which may be the transformer model 600 of FIG. 6. Examples of training data are the product descriptions, blog posts, or social media posts discussed above. The training may be performed by updating the parameters (e.g. weights) of the model based on a comparison of the output of the model to product descriptions associated with market success.

In some embodiments, the text corresponding to the product may be determined to be associated with the market success of the product. For example, as discussed above, the text corresponding to a product may include a product description determined to have contributed to the market success of its respective product. Market success relates to how well a product is received in a commercial market, and may be based on any of the non-limiting list of metrics or parameters: sales data, such as quantity and/or dollar amount of sales of the product and/or conversion rate; quantity of sales of the product relative to the total number of sales for similar products; pages views, including the number of customers that viewed the product (for example, the click-through rate of a website link associated with a product); average time customers spent viewing the product page; social media re-sharing of a product or a product page; and quantity and/or quality of positive reviews posted online associated with the product.

Therefore, in some embodiments, the market success of the product may be based on: a conversion rate of the product; and/or an amount of sales of the product; and/or a quantity of sales of the product relative to a total number of sales for similar products; and/or pages views, the pages views including the number of customers that viewed the product; and/or the average time customers spent viewing a product page associated with the product; and/or social media re-sharing of the product or a product page associated with the product; and/or positive reviews posted online associated with the product.

At step 1404, the processor 412 may generate a product description associated with a particular product using the generative language model post-training (e.g. upon completion of step 1402). The product description may be the first output 512 of FIG. 12.

At step 1406, the processor 412 may provide content for presentation, the content including the product description. An example of a content for presentation is the product description 1004 of FIG. 10, but without the underlines.

The method of FIG. 14 may be combined with any of the embodiments described earlier, e.g. in relation to FIG. 13. For example, the product description generated at step 1404 may be processed to identify at least a word or phrase in the product description as a candidate for modification, and the content for presentation at step 1406 may include the product description and an alternative word or phrase that may be substituted in place of the candidate for modification.

Figure 15:
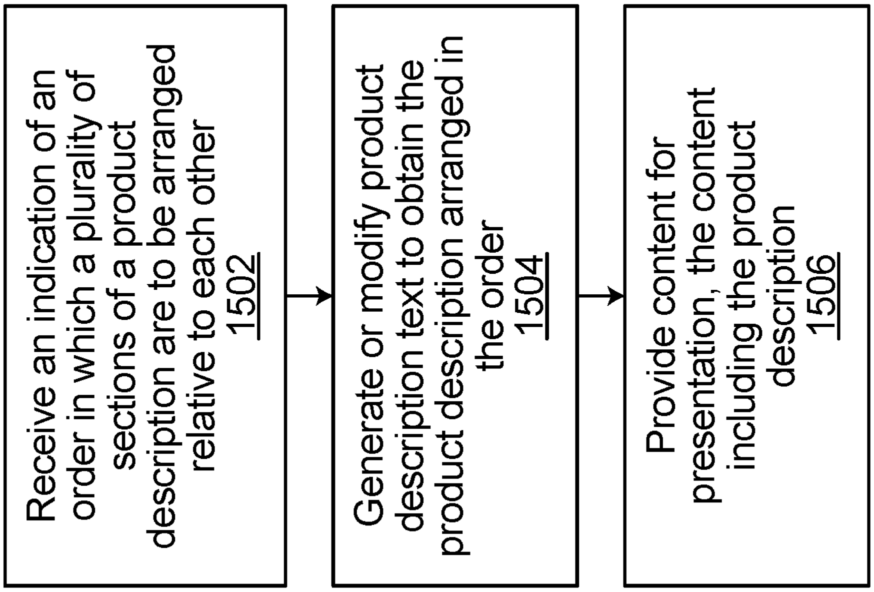

FIG. 15 illustrates a computer-implemented method, according to another embodiment. The method may be performed by or on an e-commerce platform, although this is not necessary. The steps are described as being performed by the processor 412 of product description generator 410 of FIG. 4, but this is only an example. For example, the method may instead be performed by another entity, which might or might not be part of an e-commerce platform.

At step 1502, the processor 412 may receive an indication of an order in which a plurality of sections of a product description are to be arranged relative to each other. Each section of the plurality of sections may include a sentence. Each section of the plurality of sections may be associated with a respective category of a plurality of categories. For example, the plurality of categories may relate to one or more of the classes used by the natural language processor 520.

In one example, the plurality of sections of a product description are the first, second, and third sections 1206, 1208, 1210 of the product description 1204 of FIG. 12A. The first section 1206 includes the text between the "[1]" and the "[2]", the second section 1208 includes the text between the "[2]" and the "[3]", and the third section 1210 includes the text following the "[3]". An indication of an order in which the plurality of sections are to be arranged relative to each other is shown in FIG. 12A. As mentioned above, the indication of the order in which the plurality of sections are to be arranged relative to each other may be changed, for example, by the merchant dragging and dropping the sections until a desired order is reached.

In another example, the order in which the plurality of sections of the product description are to be arranged relative to each other may be indicated by indicating the order of categories, like in FIG. 12B. In FIG. 12B, each of the first, second, and third sections referred to in table 1200 is associated with a respective category of a plurality of categories, as shown. The indication of the order in which the sections are to be arranged relative to each other is achieved by indicating the order of the categories.

At step 1504, the processor 412 may generate or modify the product description text to obtain the product description arranged in the order. For example, as described above, the product description generator 410 may generate a product description such that it follows the order set out in FIG. 12B, or the product description generator 410 may modify the text of a product description such that it follows the order set out in FIG. 12B.

At step 1506, the processor may provide content for presentation, the content including the product description.

The method of FIG. 15 may be combined with any of the embodiments described earlier, e.g. in relation to FIG. 13 or FIG. 14. For example, the indication of an order received at step 1502 may be used to generate a product description associated with a product, and the content for presentation at step 1506 may include the product description and an alternative word or phrase that may be substituted in place of the candidate for modification.

Conclusion

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:

providing a prompt to a generative language machine learning model;

responsive to the prompt, the generative language machine learning model generating a sequence of tokens, each token of the sequence based on one or more previous tokens in the sequence, and each token associated with a respective segment of a description;

sequentially outputting a plurality of segments represented by the sequence of tokens to generate a product description;

during a process of generating a given segment of the plurality of segments, the given segment associated with a given token corresponding to a first entry of a logits vector generated by the generative language machine learning model, storing in a memory a different token associated with an alternative segment, the different token corresponding to a second entry of the logits vector but not selected and included as part of the sequence of tokens generated by the generative language machine learning model and therefore not used to form part of the product description, the different token having been determined by the generative language machine learning model to be associated with a lower probability than the given token;

processing the product description to identify the given segment of the product description as a candidate for modification; and providing content for presentation, the content including the product description and an alternative word or phrase that may be substituted in place of the candidate for modification, wherein the alternative word or phrase that may be substituted in place of the candidate for modification is the alternative segment that is associated with the different token stored in memory and determined by the generative machine learning model to be associated with a lower probability than the given token.

2. The computer-implemented method of claim 1, wherein generating the product description comprises:

receiving the prompt to provide to the generative language machine learning model, the prompt including text corresponding to the product.

3. The computer-implemented method of claim 2, wherein the prompt further includes one or both of an example product title and an example product description.

4. The computer-implemented method of claim 1, wherein the generative language machine learning model sequentially outputs the plurality of segments of the product description, each next segment determined by the generative language machine learning model as being associated with a highest probability of being the next segment.

5. The computer-implemented method of claim 1, wherein the alternative word or phrase that may be substituted in place of the candidate for modification is determined based on use of the alternative word or phrase in relation to other products.

6. The computer-implemented method of claim 1 further comprising:

processing an image depicting the product to obtain an attribute related to the product as depicted in the image; and including, in the content, a particular word or phrase associated with the attribute.

7. The computer-implemented method of claim 6 further comprising modifying the product description to include the particular word or phrase associated with the attribute.

8. The computer-implemented method of claim 6, wherein the alternative word or phrase that may be substituted in place of the candidate for modification is the particular word or phrase associated with the attribute.

9. A system comprising:

at least one processor; and a memory storing processor-executable instructions that, when executed, cause the at least one processor to:

provide a prompt to a generative language machine learning model to cause the generative language machine learning model to generate a sequence of tokens responsive to the prompt, each token of the sequence based on one or more previous tokens in the sequence, and each token associated with a respective segment of a description;

sequentially output a plurality of segments represented by the sequence of tokens to generate a product description;

during a process of generating a given segment of the plurality of segments, the given segment associated with a given token corresponding to a first entry of a logits vector generated by the generative language machine learning model, store in a memory a different token associated with an alternative segment, the different token corresponding to a second entry of the logits vector but not selected and included as part of the sequence of tokens generated by the generative language machine learning model and therefore not used to form part of the product description, the different token having been determined by the generative language machine learning model to be associated with a lower probability than the given token;

process the product description to identify the given segment of the product description as a candidate for modification; and provide content for presentation, the content including the product description and an alternative word or phrase that may be substituted in place of the candidate for modification, wherein the alternative word or phrase that may be substituted in place of the candidate for modification is the alternative segment that is associated with the different token stored in memory and determined by the generative machine learning model to be associated with a lower probability than the given token.

10. The system of claim 9, wherein the at least one processor is further configured to:

receive the prompt to provide to the generative language machine learning model, the prompt including text corresponding to the product.

11. The system of claim 9, wherein the at least one processor is configured to use the generative language machine learning model to sequentially output the plurality of segments of the product description, and wherein each next segment is associated with a highest probability of being the next segment.

12. The system of claim 9, wherein the alternative word or phrase that may be substituted in place of the candidate for modification is determined based on use of the alternative word or phrase in relation to other products.

13. The system of claim 9, wherein the at least one processor is further configured to:

process an image depicting the product to obtain an attribute related to the product as depicted in the image; and include, in the content, a particular word or phrase associated with the attribute.

14. The system of claim 13 wherein the at least one processor is further configured to modify the product description to include the particular word or phrase.

15. The system of claim 13, wherein the alternative word or phrase that may be substituted in place of the candidate for modification is the particular word or phrase associated with the attribute.

16. A non-transitory computer readable medium having stored thereon computer-executable instructions that, when executed by a computer, cause the computer to perform operations comprising:

providing a prompt to a generative language machine learning model;

responsive to the prompt, the generative language machine learning model generating a sequence of tokens, each token of the sequence based on one or more previous tokens in the sequence, and each token associated with a respective segment of a description;

sequentially outputting a plurality of segments represented by the sequence of tokens to generate a product description;

during a process of generating a given segment of the plurality of segments, the given segment associated with a given token corresponding to a first entry of a logits vector generated by the generative language machine learning model, storing in a memory a different token associated with an alternative segment, the different token corresponding to a second entry of the logits vector but not selected and included as part of the sequence of tokens generated by the generative language machine learning model and therefore not used to form part of the product description, the different token having been determined by the generative language machine learning model to be associated with a lower probability than the given token;

processing the product description to identify the given segment of the product description as a candidate for modification; and providing content for presentation, the content including the product description and an alternative word or phrase that may be substituted in place of the candidate for modification, wherein the alternative word or phrase that may be substituted in place of the candidate for modification is the alternative segment that is associated with the different token stored in memory and determined by the generative machine learning model to be associated with a lower probability than the given token.

17. The non-transitory computer readable medium of claim 16, wherein the generative language machine learning model sequentially outputs the plurality of segments of the product description, each next segment determined by the generative machine learning language model as being associated with a highest probability of being the next segment.

18. The non-transitory computer readable medium of claim 16, wherein the instructions, when executed by the computer, further cause the computer to perform operations comprising:

processing an image depicting the product to obtain an attribute related to the product as depicted in the image; and including, in the content, a particular word or phrase associated with the attribute.

19. The non-transitory computer readable medium of claim 18, wherein the instructions, when executed by the computer, further cause the computer to perform operations comprising:

modifying the product description to include the particular word or phrase associated with the attribute.

20. The non-transitory computer readable medium of claim 18, wherein the alternative word or phrase that may be substituted in place of the candidate for modification is the particular word or phrase associated with the attribute.

* * * * *